(12) United States Patent
Benjamin et al.

(10) Patent No.: US 9,151,900 B2
(45) Date of Patent: Oct. 6, 2015

(54) OPTICAL COUPLINGS HAVING CODED MAGNETIC ARRAYS AND DEVICES INCORPORATING THE SAME

(71) Applicant: CORNING OPTICAL COMMUNICATIONS LLC, Hickory, NC (US)

(72) Inventors: Seldon David Benjamin, Painted Post, NY (US); Jeffery Alan DeMeritt, Painted Post, NY (US); Micah Colen Isenhour, Lincolnton, NC (US); Dennis Michael Knecht, Hickory, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/315,776

(22) Filed: Jun. 26, 2014

(65) Prior Publication Data

US 2014/0308002 A1 Oct. 16, 2014

Related U.S. Application Data

(62) Division of application No. 13/221,428, filed on Aug. 30, 2011, now Pat. No. 8,774,577.

(60) Provisional application No. 61/420,673, filed on Dec. 7, 2010, provisional application No. 61/420,679, filed on Dec. 7, 2010.

(51) Int. Cl.
*G02B 6/26* (2006.01)
*G02B 6/32* (2006.01)
(Continued)

(52) U.S. Cl.
CPC .. *G02B 6/32* (2013.01); *G02B 6/26* (2013.01); *G02B 6/3886* (2013.01); *G02B 6/4204* (2013.01); *G02B 6/4214* (2013.01); *G02B 6/4292* (2013.01)

(58) Field of Classification Search
CPC .......... G02B 6/32; G02B 6/26; G02B 6/3886; G02B 6/4204; G02B 6/4214; G02B 6/4292
USPC ....................................... 385/15, 33
See application file for complete search history.

(56) References Cited

U.S. PATENT DOCUMENTS

| 4,213,677 A | 7/1980 | Sugimoto et al. | 350/96.18 |
| 4,268,112 A | 5/1981 | Peterson | 350/96.18 |

(Continued)

FOREIGN PATENT DOCUMENTS

| AU | 199898138 B2 | 8/1999 |
| EP | 0258569 A2 | 3/1988 |

(Continued)

OTHER PUBLICATIONS

P. Chanclou, C. Kaczmarek, G. Mouzer, O. Gautreau, M. Thual, & P. Grosso, "Design and demonstration of a multicore single-mode fiber coupled lens device," *Optics Communications* 233, 2004, pp. 333-339.

(Continued)

*Primary Examiner* — Jerry Blevins

(57) ABSTRACT

Optical couplings for making and optical connection between one or more devices are disclosed. In one embodiment, an optical coupling includes a coupling face, an optical interface within the coupling face, an optical component positioned within the optical interface, and at least one coded magnetic array. The at least one coded magnetic array may include a plurality of magnetic regions configured aid in mating the optical component with a corresponding optical component of a complementary mated optical coupling to a predetermined tolerance for optical communication. Optical cable assemblies and electronics devices having optical couplings with optical interfaces using coded magnetic arrays are also disclosed.

14 Claims, 16 Drawing Sheets

(51) Int. Cl.
*G02B 6/42* (2006.01)
*G02B 6/38* (2006.01)

(56) References Cited

U.S. PATENT DOCUMENTS

| | | | | |
|---|---|---|---|---|
| 4,636,032 A | 1/1987 | Grego | | 350/96.21 |
| 4,641,915 A | 2/1987 | Asakawa et al. | | 350/96.18 |
| 4,701,011 A | 10/1987 | Emkey et al. | | 350/96.18 |
| 4,844,582 A | 7/1989 | Giannini | | 350/96.21 |
| 5,085,062 A | 2/1992 | Capdevila | | 70/276 |
| 5,172,271 A | 12/1992 | Sinclair | | 359/652 |
| 5,384,874 A | 1/1995 | Hirai et al. | | 385/34 |
| 5,784,512 A | 7/1998 | Hensen | | 385/61 |
| 5,832,153 A | 11/1998 | Duck | | 385/34 |
| 5,850,493 A | 12/1998 | Cheng | | 385/34 |
| 5,923,802 A | 7/1999 | Giebel et al. | | 385/76 |
| 6,012,852 A | 1/2000 | Kadar-Kallen et al. | | 385/74 |
| 6,033,125 A | 3/2000 | Stillie et al. | | 385/75 |
| 6,157,485 A | 12/2000 | Cheng | | 359/495 |
| 6,246,026 B1 | 6/2001 | Vergeest | | 219/121.72 |
| 6,542,665 B2 | 4/2003 | Reed et al. | | 385/34 |
| 6,632,025 B2 | 10/2003 | Ukrainczyk | | 385/70 |
| 6,655,850 B2 | 12/2003 | Mann et al. | | 385/74 |
| 6,687,434 B2 | 2/2004 | Ishikawa | | 385/34 |
| 6,736,547 B2 | 5/2004 | Stevens et al. | | 385/61 |
| 6,837,625 B2 | 1/2005 | Schott et al. | | 385/60 |
| 6,899,464 B2 | 5/2005 | Stevens et al. | | 385/53 |
| 6,963,687 B2 | 11/2005 | Vergeest et al. | | 385/123 |
| 7,077,576 B2 | 7/2006 | Luther et al. | | 385/59 |
| 7,104,701 B1 | 9/2006 | Durrant et al. | | 385/74 |
| 7,329,050 B1 | 2/2008 | Dugan et al. | | 385/55 |
| 7,346,236 B2 | 3/2008 | Asano et al. | | 385/34 |
| 7,346,237 B2 | 3/2008 | Matsumura et al. | | 385/34 |
| 7,346,240 B1 * | 3/2008 | He et al. | | 385/48 |
| 7,357,005 B2 | 4/2008 | Matsumura et al. | | 65/387 |
| 7,460,750 B2 | 12/2008 | Durrant et al. | | 385/35 |
| 7,522,793 B2 | 4/2009 | Drabarek et al. | | 385/52 |
| 7,572,071 B1 | 8/2009 | Wu | | 385/94 |
| 7,603,008 B2 | 10/2009 | Matsumura et al. | | 385/35 |
| 7,681,256 B2 | 3/2010 | Fullerton et al. | | 2/410 |
| 7,724,113 B2 | 5/2010 | Fullerton et al. | | 335/306 |
| 7,724,114 B2 | 5/2010 | Fullerton et al. | | 335/306 |
| 7,746,205 B2 | 6/2010 | Fullerton et al. | | 335/306 |
| 7,750,773 B2 | 7/2010 | Fullerton et al. | | 335/285 |
| 7,750,774 B2 | 7/2010 | Fullerton et al. | | 335/285 |
| 7,750,777 B2 | 7/2010 | Fullerton et al. | | 335/306 |
| 7,750,778 B2 | 7/2010 | Fullerton et al. | | 335/306 |
| 7,750,779 B2 | 7/2010 | Fullerton et al. | | 335/306 |
| 7,750,780 B2 | 7/2010 | Fullerton et al. | | 335/306 |
| 7,750,781 B2 | 7/2010 | Fullerton et al. | | 335/306 |
| 7,755,462 B2 | 7/2010 | Fullerton et al. | | 335/306 |
| 7,760,058 B2 | 7/2010 | Fullerton et al. | | 335/285 |
| 7,772,951 B2 | 8/2010 | Fullerton et al. | | 335/306 |
| 7,772,952 B2 | 8/2010 | Fullerton et al. | | 335/306 |
| 7,775,725 B2 | 8/2010 | Grinderslev | | 385/74 |
| 7,800,348 B2 | 9/2010 | Fullerton et al. | | 335/284 |
| 7,800,471 B2 | 9/2010 | Fullerton et al. | | 335/306 |
| 7,800,472 B2 | 9/2010 | Fullerton et al. | | 335/306 |
| 7,800,473 B2 | 9/2010 | Fullerton et al. | | 335/306 |
| 7,808,348 B2 | 10/2010 | Fullerton et al. | | 335/306 |
| 7,808,349 B2 | 10/2010 | Fullerton et al. | | 335/306 |
| 7,808,350 B2 | 10/2010 | Fullerton et al. | | 335/306 |
| 7,812,697 B2 | 10/2010 | Fullerton et al. | | 335/306 |
| 7,812,698 B2 | 10/2010 | Fullerton et al. | | 335/306 |
| 7,817,002 B2 | 10/2010 | Fullerton et al. | | 335/306 |
| 7,817,003 B2 | 10/2010 | Fullerton et al. | | 335/306 |
| 7,817,004 B2 | 10/2010 | Fullerton et al. | | 335/306 |
| 7,817,005 B2 | 10/2010 | Fullerton et al. | | 335/306 |
| 7,817,006 B2 | 10/2010 | Fullerton et al. | | 335/306 |
| 7,817,367 B2 | 10/2010 | Fullerton et al. | | 335/306 |
| 7,823,224 B2 | 11/2010 | Fullerton et al. | | 2/410 |
| 7,823,300 B2 | 11/2010 | Fullerton et al. | | 36/113 |
| 7,824,083 B2 | 11/2010 | Fullerton et al. | | 362/398 |
| 7,834,728 B2 | 11/2010 | Fullerton et al. | | 335/296 |
| 7,834,729 B2 | 11/2010 | Fullerton et al. | | 335/306 |
| 7,839,244 B2 | 11/2010 | Fullerton et al. | | 335/284 |
| 7,839,245 B2 | 11/2010 | Fullerton et al. | | 335/296 |
| 7,839,246 B2 | 11/2010 | Fullerton et al. | | 335/306 |
| 7,839,247 B2 | 11/2010 | Fullerton et al. | | 335/306 |
| 7,839,248 B2 | 11/2010 | Fullerton et al. | | 335/306 |
| 7,841,776 B2 | 11/2010 | DiFonzo et al. | | 385/57 |
| 7,843,294 B2 | 11/2010 | Fullerton et al. | | 335/296 |
| 7,843,295 B2 | 11/2010 | Fullerton et al. | | 335/306 |
| 7,843,296 B2 | 11/2010 | Fullerton et al. | | 335/306 |
| 7,843,297 B2 | 11/2010 | Fullerton et al. | | 335/306 |
| 7,855,624 B2 | 12/2010 | Fullerton et al. | | 335/306 |
| 7,864,009 B2 | 1/2011 | Fullerton et al. | | 335/306 |
| 7,864,010 B2 | 1/2011 | Fullerton et al. | | 335/306 |
| 7,864,011 B2 | 1/2011 | Fullerton et al. | | 335/306 |
| 7,868,721 B2 | 1/2011 | Fullerton et al. | | 335/284 |
| 7,889,038 B2 | 2/2011 | Fullerton et al. | | 335/306 |
| 7,893,803 B2 | 2/2011 | Fullerton et al. | | 335/285 |
| 7,956,711 B2 | 6/2011 | Fullerton et al. | | 335/285 |
| 7,956,712 B2 | 6/2011 | Fullerton et al. | | 335/285 |
| 7,958,575 B2 | 6/2011 | Fullerton et al. | | 4/242.1 |
| 7,961,068 B2 | 6/2011 | Fullerton et al. | | 335/306 |
| 7,961,069 B2 | 6/2011 | Fullerton et al. | | 335/306 |
| 7,963,818 B2 | 6/2011 | Fullerton et al. | | 446/93 |
| 7,982,568 B2 | 7/2011 | Fullerton et al. | | 335/306 |
| 8,015,752 B2 | 9/2011 | Fullerton et al. | | 49/70 |
| 8,016,330 B2 | 9/2011 | Fullerton et al. | | 292/251.5 |
| 8,035,260 B2 | 10/2011 | Fullerton et al. | | 310/49.01 |
| 2002/0146211 A1 | 10/2002 | Stevens et al. | | 385/61 |
| 2003/0012496 A1 | 1/2003 | Yamagata et al. | | 385/33 |
| 2003/0012513 A1 | 1/2003 | Ukrainczyk | | 385/61 |
| 2003/0021543 A1 | 1/2003 | Mann et al. | | 385/74 |
| 2004/0009697 A1 | 1/2004 | Clark et al. | | 439/362 |
| 2006/0072878 A1 | 4/2006 | Dames et al. | | 385/47 |
| 2006/0222299 A1 | 10/2006 | Durrant et al. | | 385/74 |
| 2008/0050072 A1 | 2/2008 | Durrant et al. | | 385/74 |
| 2008/0122579 A1 | 5/2008 | German et al. | | 340/10.1 |
| 2008/0279509 A1 | 11/2008 | Durrant et al. | | 385/72 |
| 2009/0041412 A1 | 2/2009 | Danley et al. | | 385/85 |
| 2009/0249612 A1 | 10/2009 | Fullerton et al. | | 29/602.1 |
| 2009/0250032 A1 | 10/2009 | Fullerton et al. | | 123/143 B |
| 2009/0324175 A1 | 12/2009 | Everett et al. | | 385/72 |
| 2009/0324176 A1 | 12/2009 | Cheng et al. | | 385/73 |
| 2010/0027943 A1 | 2/2010 | Armani et al. | | 385/74 |
| 2010/0080563 A1 | 4/2010 | DiFonzo et al. | | 398/115 |
| 2010/0225430 A1 | 9/2010 | Fullerton et al. | | 335/306 |
| 2012/0155803 A1 | 6/2012 | Benjamin et al. | | 385/33 |

FOREIGN PATENT DOCUMENTS

| | | | | |
|---|---|---|---|---|
| EP | 1447695 A2 | 8/2004 | | |
| JP | 58-209705 | 12/1983 | | |
| JP | 59-37511 A | 3/1984 | | |
| JP | 63-293510 A | 11/1988 | | |
| WO | WO 00/74277 A1 | 12/2000 | | H04B 10/00 |
| WO | WO 01/11409 A2 | 2/2001 | | G02B 23/24 |
| WO | WO 03/076993 A1 | 9/2003 | | G02B 6/32 |
| WO | WO 2008/058505 A1 | 5/2008 | | G02B 6/38 |

OTHER PUBLICATIONS

S.D. Cusworth & J.M. Senior, "Angular tilt misalignment loss at a GRIN rod lens coupler," *Applied Optics*, vol. 25, No. 11, Jun. 1, 1986, pp. 1775-1779.

W.L. Emkey & C.A. Jack, "Analysis and Evaluation of Graded-Index Fiber-Lenses," *Journal of Lightwave Technology*, vol. LT-5, No. 9, Sep. 1987, pp. 1156-1164.

R.W. Gilsdorf & J.C. Palais, "Single-mode fiber coupling efficiency with graded-index rod lenses," *Applied Optics*, vol. 33, No. 16, Jun. 1, 1994, pp. 3440-3445.

J.C. Palais, "Fiber coupling using graded-index rod lenses," *Applied Optics*, vol. 19, No. 12, Jun. 15, 1980, pp. 2011-2018.

J.M. Senior, S.D. Cusworth, N.G. Burrow, & A.D. Muirhead, "Misalignment losses at multimode graded-index fiber splices and GRIN rod lens couplers," *Applied Optics*, vol. 24, No. 7, Apr. 1, 1985, pp. 977-983.

(56) References Cited

OTHER PUBLICATIONS

W. J. Tomlinson, "Applications of GRIN-rod lenses in optical fiber communications systems," *Applied Optics*, vol. 19, No. 7, Apr. 1, 1980, pp. 1127-1138.
Patent Cooperation Treaty, International Search Report for International Application No. PCT/US2011/063630, Mailing Date May 14, 2012, 5 pages.
Patent Cooperation Treaty, International Search Report for International Application No. PCT/US2011/063626, Mailing Date May 21, 2012, 5 pages.
Patent Cooperation Treaty, International Search Report and Written Opinion for International Application No. PCT/US2012/066033, Mailing Date Feb. 27, 2013, 13 pages.
http:\\www.cvimellesgroit.com, "Gradient-Index Lenses".

\* cited by examiner

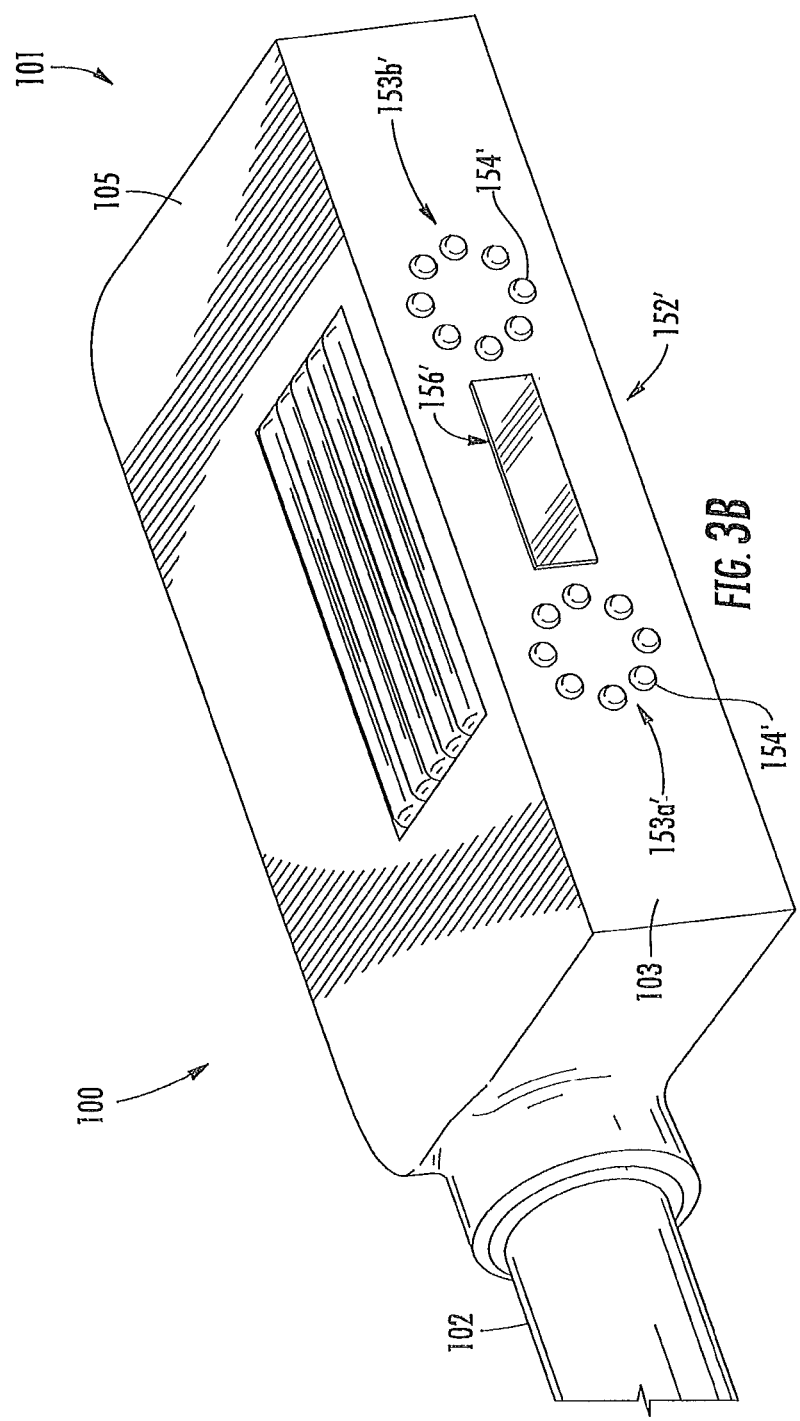

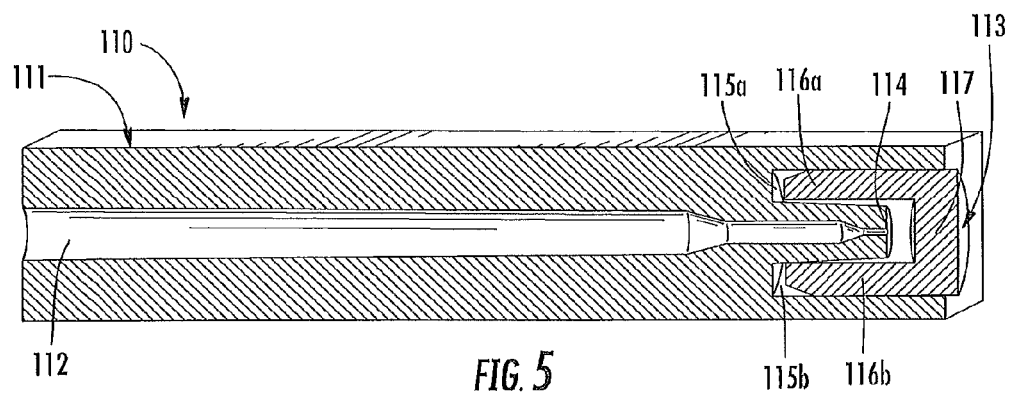
FIG. 5
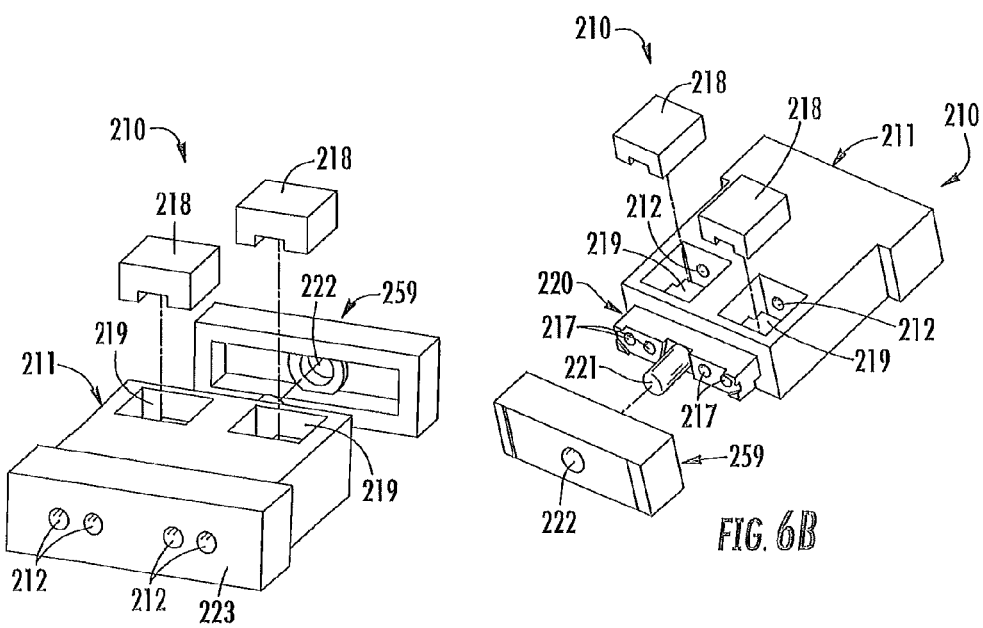
FIG. 6A
FIG. 6B

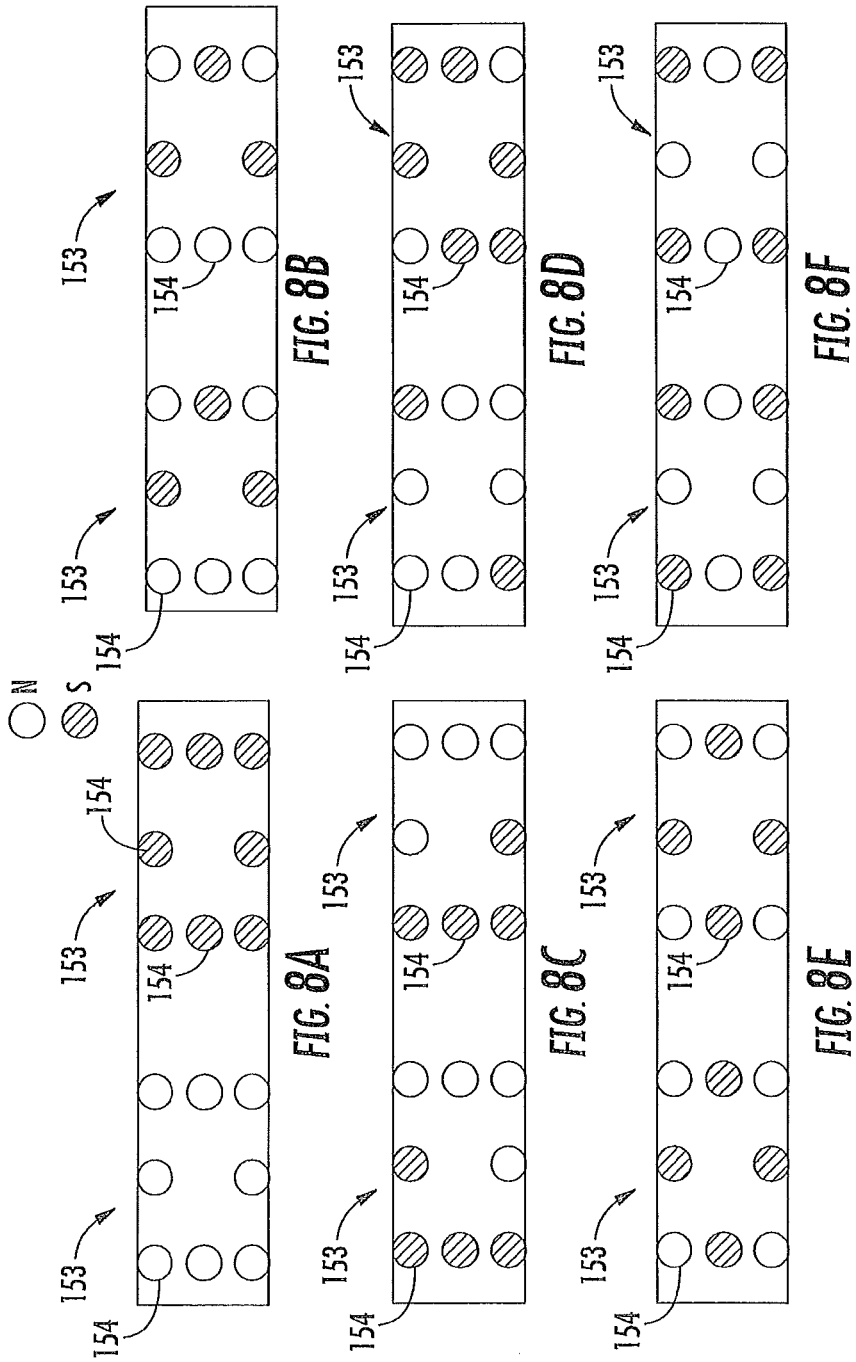

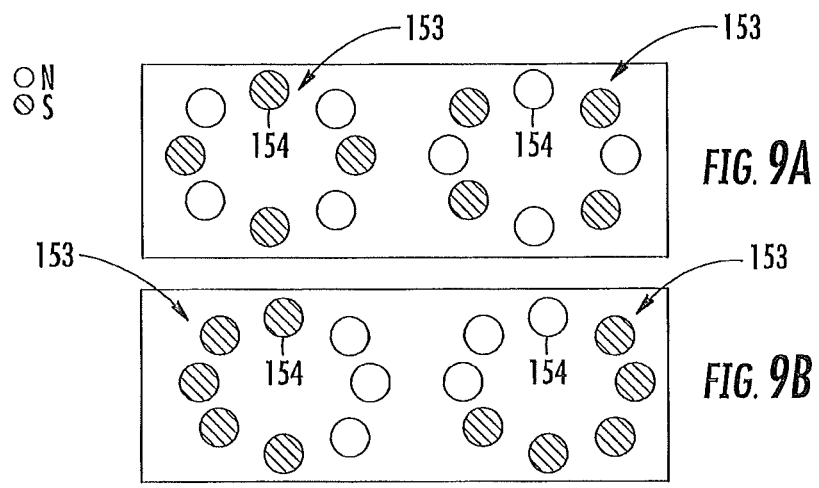
FIG. 9A
FIG. 9B
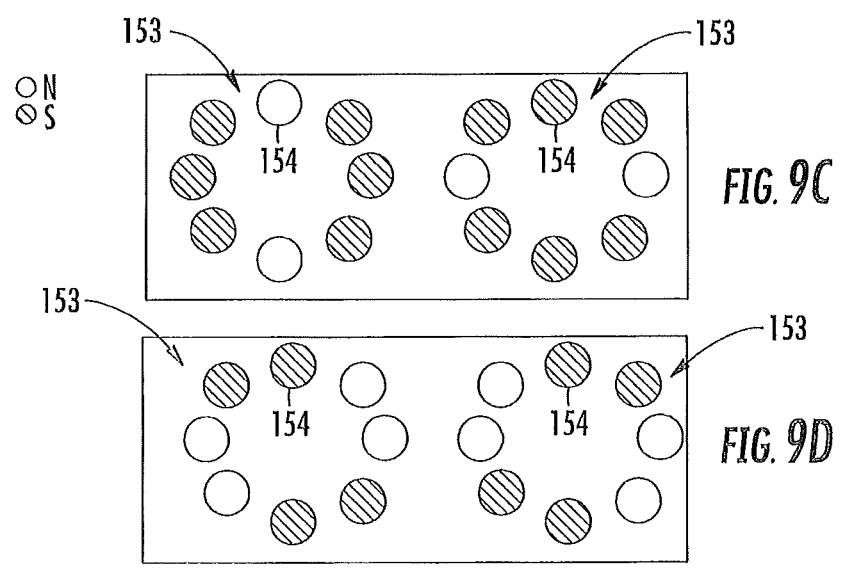
FIG. 9C
FIG. 9D

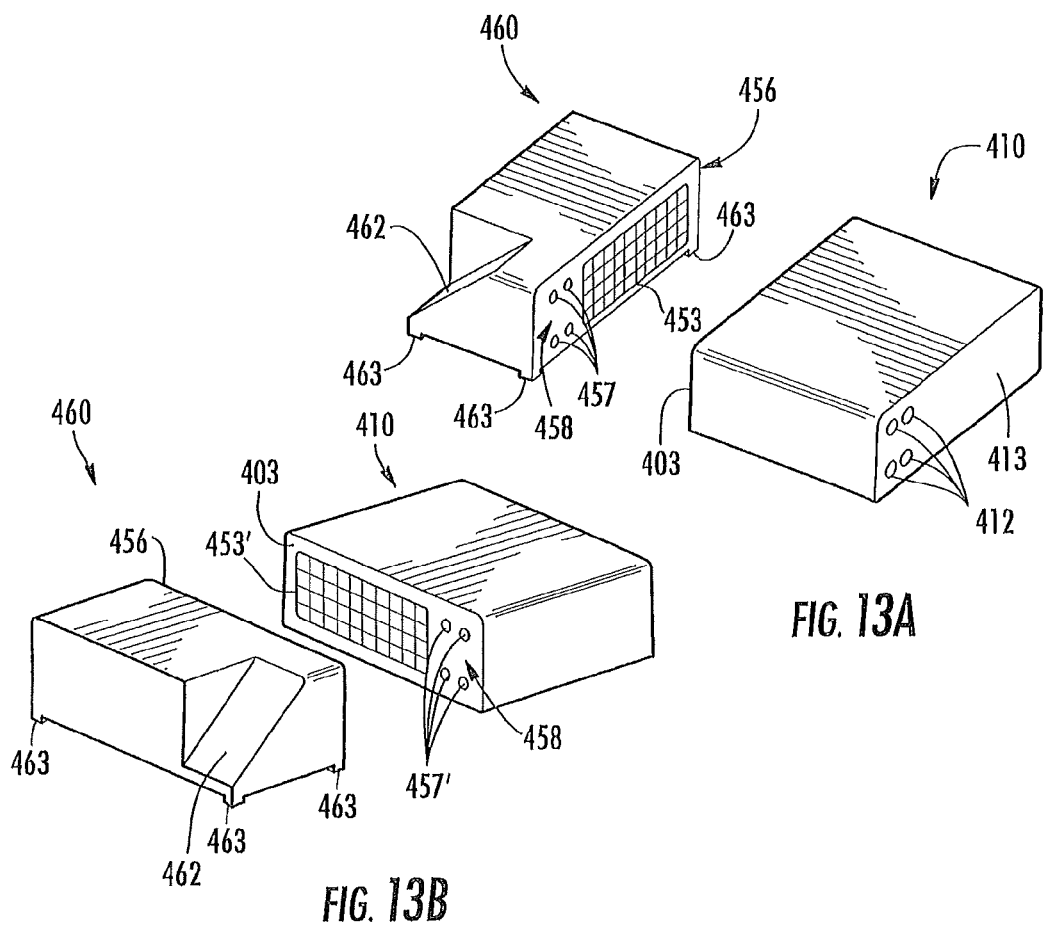

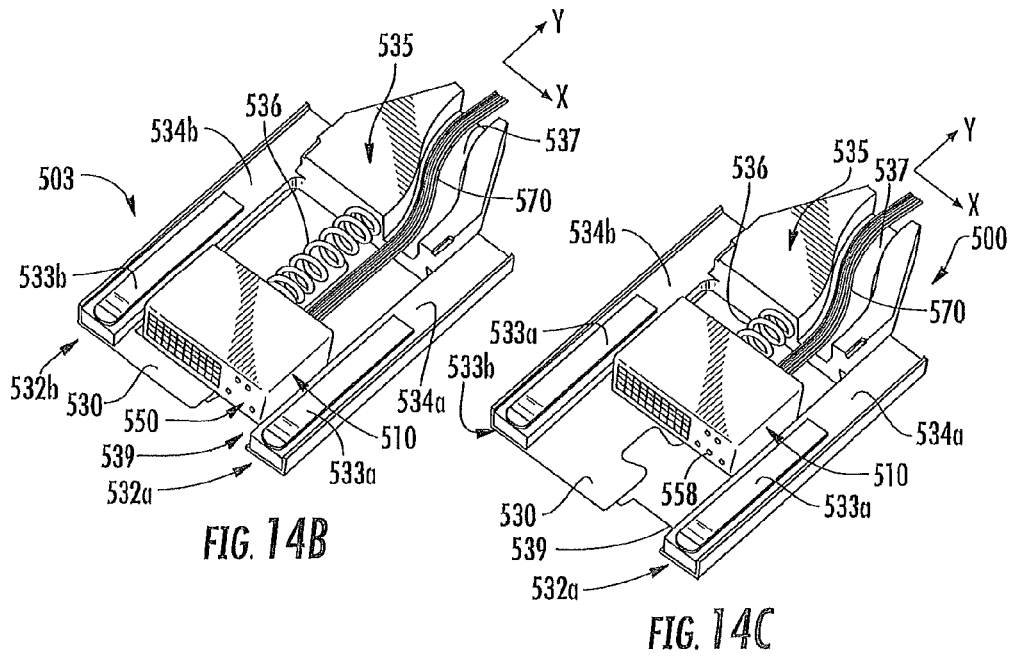
FIG. 14B
FIG. 14C
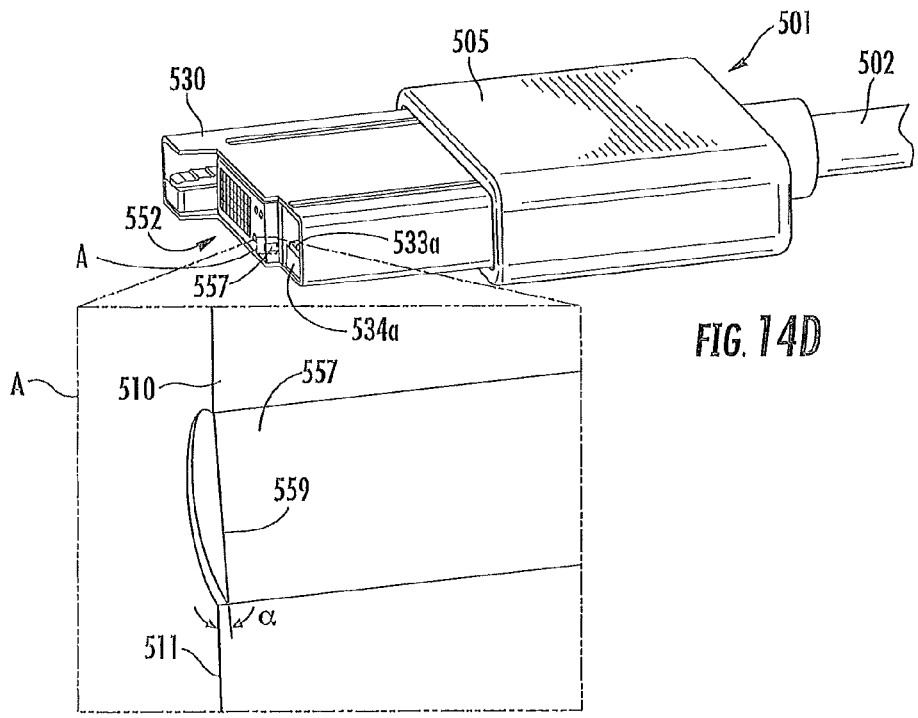
FIG. 14D

OPTICAL COUPLINGS HAVING CODED MAGNETIC ARRAYS AND DEVICES INCORPORATING THE SAME

RELATED APPLICATIONS

This is a divisional of U.S. patent application Ser. No. 13/221,428, filed on Aug. 30, 2011, which claims the benefit of priority to U.S. Provisional Application No. 61/420,673 filed on Dec. 7, 2010 and U.S. Provisional Application Ser. No. 61/420,679 filed on Dec. 7, 2010, the content of which is relied upon and incorporated herein by reference in its entirety.

BACKGROUND

The present disclosure generally relates to optical couplings and, more particular, optical couplings comprising an optical interface and a coded magnetic array.

Fiber optic cables have advantages over conventional copper conductor cables especially as data rates increase due to bandwidth limitations of copper cables. As a result, fiber optic cables have replaced much of the copper in communication networks and are migrating into other application spaces. As the use of fiber optics migrates into numerous consumer electronics applications, such as connecting computer peripherals by the use of fiber optic cable assemblies, there will be a consumer-driven expectation for cables having improved performance, compatibility with future communication protocols, and a broad range of use. Unlike telecommunication optical connections, consumer applications experience a large number of mating and unmating cycles that may cause issues with reliability and performance over the desired number of mating cycles. For instance, conventional opto-mechanical interfaces utilized to optically couple an optical cable assembly to active optical components of an electronics device require precise mechanical structures to properly align the optical fibers of the optical cable assembly with the laser(s) and/or photodiode(s) of the electronics device. Consequently, conventional opto-mechanical interfaces require tight tolerances for alignment that are expensive, may not be rugged enough for consumer electronics applications, and/or will have degraded performance over the desired number of mating cycles. For instance, the mechanical structures often cause the optical interface of the optical cable assembly and the electronics device to be susceptible to the build-up of foreign substances (e.g., dust, liquid, food particles, etc.) that may interfere with the mating and propagation of optical signals between the optical cable assembly and the electronics device.

Accordingly, alternative optical couplings, optical cable assemblies and electronics devices are desired.

SUMMARY

Embodiments of the present disclosure relate to optical couplings, such as optical couplings utilized by optical cable assemblies and electronic devices, for optical communication. As an example, an optical cable assembly may comprise an optical coupling at each end that is configured to mate with corresponding optical couplings of electronics devices so that two (or more) coupled electronics devices may communicate with one another via optical signals over the optical cable assembly.

More specifically, embodiments are directed to optical couplings comprising an optical interface within a coupling face of an optical cable assembly or an electronics device, and one or more coded magnetic arrays configured to optically couple an optical component of the optical coupling with a corresponding (i.e., complimentary) optical component of a mated optical coupling. The optical interface may be easily accessible to a user so that the user may wipe the optical interface of any foreign substances, such as dirt, dust, liquid etc. The optical interface may also be liquid-displacing, such that liquids are substantially displaced from the optical interface upon connection with the optical interface of a mated optical coupling.

The coded magnetic arrays may be configured to both maintain two optical couplings coupled together by magnetic force, as well as provide the precise alignment between optical components associated with the optical couplings. Such optical components may be, without limitation, optical fibers of an optical cable assembly, laser diodes, photodiodes, and the like. The coded magnetic array may provide high accuracy alignment without having to resort to the precision fits that conventional opto-electronic interfaces using pins or rails require. The coded magnetic array (or arrays) may comprise a plurality of magnetic regions configured to be magnetically coupled to a corresponding coded magnetic array to optically couple the optical components. In another embodiment, mechanical features may also be provided to help maintain the connections between mated optical couplings. Electrically conductive features may also be optionally included to provide electrical power through the coupling as well. By way of example, the optical couplings disclosed herein may be disposed on a connector of a cable assembly, an electronics device, or like devices.

One aspect of the disclosure is directed to an optical coupling including a coupling face, an optical interface within the coupling face, an optical component positioned within the optical interface, and at least one coded magnetic array having a plurality of magnetic regions configured for mating the optical component. The optical coupling may also optionally include other features. For instance, the optical component may optionally be optically aligned using a lens such as at least one graded-refractive index (GRIN) lens. Embodiments may also optionally position a lens with facet angled with respect to the optical interface such as at an angle between 0 degrees to 10 degrees as desired. The optical interface may be substantially planar so that it is accessible and easy to clean. Furthermore, the optical coupling (whether it includes a lens or not) uses the at least one coded magnetic array to optically couple and align optical components and/or active devices with a complimentary component of a mated optical coupling to within less than 40 microns of the respective centerlines. In other words, the coded magnetic array allows fine alignment for the optical coupling.

Another aspect of the disclosure is an optical cable assembly including a connector housing having a coupling face, a lens assembly within the connector housing, the lens assembly including an optical interface and a lens component, an optical fiber including a fiber end that is maintained within the lens assembly at a fiber end location, and at least one coded magnetic array, the at least one coded magnetic array including a plurality of magnetic regions configured for aligning the coupling face.

A further aspect of the disclosure is an electronics device having a device housing comprising a housing surface, an optical coupling within the housing surface, the optical coupling including an optical interface within the housing surface, an active optical component positioned within the device housing and in an optical path of an optical signal transmitted into and/or out of the optical interface, and at least one coded magnetic array having a plurality of magnetic regions configured for mating the active optical component.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3B schematically depicts a top, front perspective view of an explanatory connector assembly having an optical coupling according to one or more embodiments shown and described herein;

FIG. 5 schematically depicts a cross-sectional view of a lens assembly according to one or more embodiments shown and described herein;

FIG. 6A schematically depicts a top, rear-side exploded view of a lens assembly according to one or more embodiments shown and described herein;

FIG. 6B schematically depicts a top, front-side exploded view of the lens assembly depicted in FIG. 6A;

FIGS. 8A-8F depict explanatory representative magnetic coding patterns of a rectangular shaped coded magnetic array according to one or more embodiments shown and described herein;

FIGS. 9A-9D depict explanatory representative magnetic coding patterns of a circular-shaped coded magnetic array according to one or more embodiments shown and described herein;

FIGS. 13A and 13B schematically depict a device optical interface assembly and a connector optical interface assembly according to one or more embodiments shown and described herein;

FIG. 14B schematically depicts a partial view of the connector assembly depicted in FIG. 14A with the ferrule assembly in an extended position according to one or more embodiments shown and described herein;

FIG. 14C schematically depicts a partial view of the connector assembly depicted in FIG. 14A with the ferrule assembly in a retracted position according to one or more embodiments shown and described herein;

FIG. 14D schematically depicts a partial cut-away view of the connector assembly depicted in FIG. 14A and a close-up partial view of a retractable ferrule assembly according to one or more embodiments shown and described here;

DETAILED DESCRIPTION

Embodiments are directed to optical couplings, such as optical couplings utilized by optical cable assemblies and/or electronic devices such as a host or client electronics device. For instance, the device may convert optical signals by a transceiver circuit and transmit the same over one or more optical fibers or other optical component for optical communication. Likewise, optical signals received by a host or client electronics device may be converted from optical signals into electrical signals by the transceiver circuit. Embodiments described and disclosed herein may enable precise coupling between optical components by the use of coded magnetic arrays. Use of such coded magnetic arrays may eliminate the need for precisely dimensioned mechanical components such as pin or rail components for alignment of optical components (e.g., optical fibers and/or active optical components, such as lasers, photodiodes, etc.) of the optical coupling; however, the use of alignment structure is still possible with the concepts disclosed herein. Coded magnetic arrays may enable a planar optical interface with little or no mechanical structures for effectuating optical coupling requiring a relatively large number of mating cycles. Moreover, the coded magnetic arrays allow optical interfaces that are planar, thereby making the cleaning of the optical interface relatively easy. Still further, embodiments described herein may provide a liquid-displacing planar optical interface wherein liquids are forced out of the optical interface upon coupling so that any affect on optical performance is reduced.

Embodiments described herein may enable planar, liquid-displacing optical interfaces to precisely align optical components of coupled device (e.g., optical fibers and/or active optical components, such as laser and photodiodes) without significant mechanical structure.

In some embodiments, the optical interface may comprise some structural features for alignment and/or securing the connection but the region of optical coupling may still remain substantially planar for cleaning and the like. Embodiments use coded magnetic arrays to precisely align optical components within a given tolerance for the mated optical couplings of the devices. The coded magnetic arrays may also provide a magnetic force to maintain a coupled relationship between the optical couplings of the mated devices along with alignment. Optical couplings, as well as optical cable assemblies, connector assemblies, and electronics devices, will be described in further detail herein with specific reference to the appended figures.

Figure 1B:
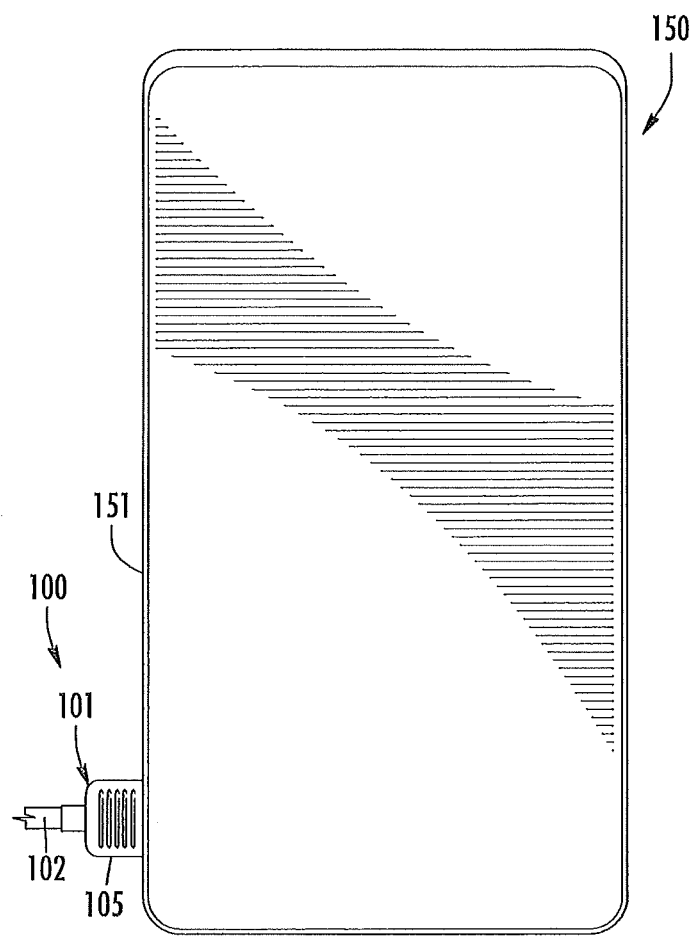
FIG. 1B schematically depicts an optical cable assembly coupled to an electronics device both having respective optical couplings according to one or more embodiments shown and described herein.
Figure 1A:
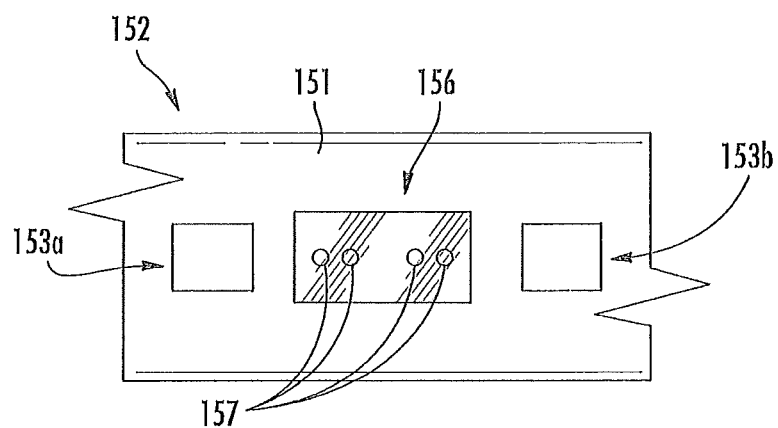
FIG. 1A schematically depicts an optical coupling according to one or more embodiments shown and described herein.

Referring initially to FIG. 1A, a schematic illustration of an optical coupling 152 is illustrated. Generally, the optical coupling comprises a coupling face 151, an optical interface 156 positioned within the coupling face 151, and at least one coded magnetic array 153a, 153b having a plurality of magnetic regions (not visible). As used herein, "within" means within, recessed, behind, at, or near. The optical interface 156 may have one or more optical components (not visible in FIG. 1A), such as laser diodes, photo diodes, optical fiber ends, etc. Optical couplings 152 may or may not use components such as lenses for beam expansion, collimating, etc. of the optical signal for improving the coupling of the optical signal. For instance, the optical coupling 152 may optionally include one or more lenses 157 within the optical interface 156 for aligning optical signals of optical components to the optical components of a mated optical coupling. In other embodiments, a lens is not utilized such that, in a cable assembly, the ends of one or more optical fibers are coupled directly to a mated optical coupling. Exemplary optical couplings are described in detail below and may be used with other suitable embodiments as appropriate.

FIG. 1B depicts an electronics device 150 and an optical cable assembly 100 each having a respective optical coupling in a coupled relationship (i.e., mated together) according to one embodiment. As described in detail below, the electronics device 150 and the optical cable assembly 100 are optically coupled via an optical interface on both the electronics device 150 and the optical cable assembly 100. In some embodiments, the optical interface may be described as a planar optical interface or substantially planar optical interface, wherein the optical interface is generally planar with respect to a coupling face, such as the front face of a connector or a housing of an electronics device As used herein, the term "planar" in relation to the optical interface means that the optical interface is generally or substantially flat such that the optical interface or surface is accessible and easily wiped by a user (i.e., cleaned to remove dirt, dust and/or debris) and the optical interface may be recessed, flush, protrude and/or be angled from a coupling face as desired As an example, the optical interface is planar even if the optical interface is angled with respect to the coupling face such as an angle between zero degrees and ten degrees, although other angles are possible. As explanatory examples, the electronics device 150 may be any electronics device, including, but not limited to, a portable media player, a cellular phone (e.g., a "smart phone") a data storage device (e.g., an external hard drive or a flash-based memory device), a digital camera, a personal, laptop, notebook, or tablet computer, a camcorder, a mobile electronics device, a server, or the like. In other words, the electronics device 150 may be any device wherein data is transferred between a first device and a second device using an optical signal for a portion of the transmission.

Embodiments described herein enable electronics devices to be optically coupled to each other for transferring data optically between the coupled electronic devices. In one embodiment, the electronics devices convert electrical signals into optical signals for optical transmission over the optical cable assembly 100 for receipt by one or more optically coupled electronics devices. The electronics devices may also be configured to receive optical signals over the optical cable assembly 100 and convert such received optical signals into electrical signals. Further, the optical interfaces on the cable assembly and the electronic device are complimentary for mating together for signal transmission therebetween and may use the same structure or different structures as desired.

Generally, the electronics device 150 may have an external housing that comprises a coupling face 151, such as a housing surface of the electronics device 150. The coupling face 151 of the electronics device 150 is the surface on which an optical cable assembly 100 or like device may be optically coupled for signal transmission. Optical cable assembly 100 may generally comprise a connector assembly 101 having connector housing 105 and a coupling face (not visible in FIG. 1) and an optical cable 102.

Figure 2:
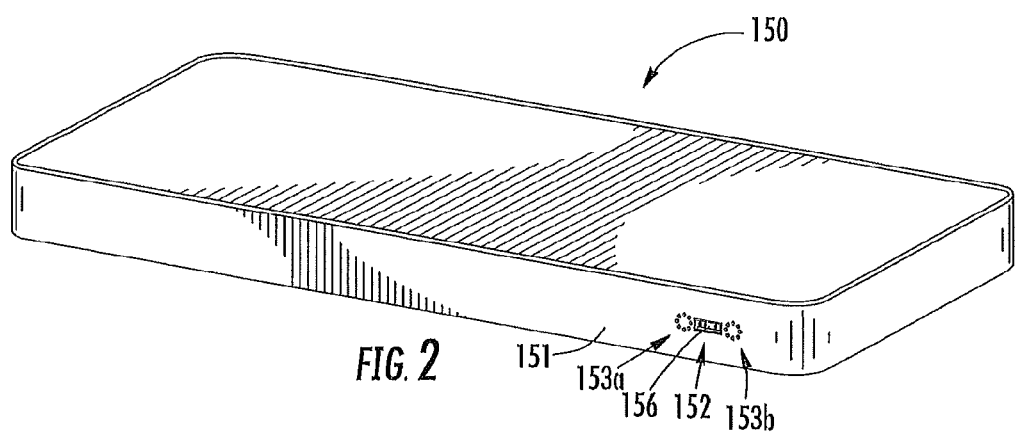
FIG. 2 schematically depicts a top, side perspective view of an electronics device having an optical coupling according to one or more embodiments shown and described herein.
Figure 3A:
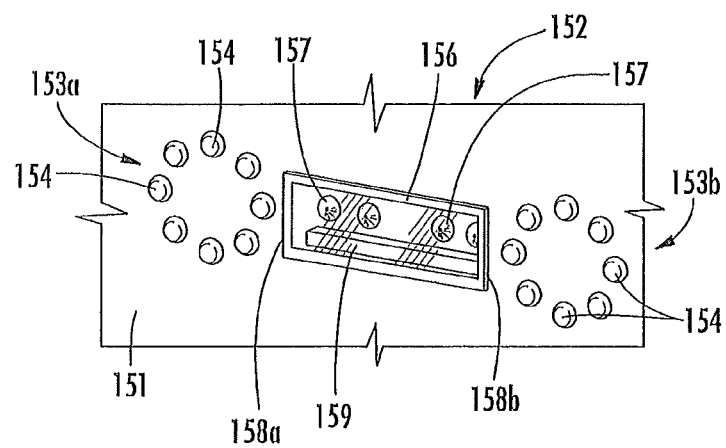
FIG. 3A schematically depicts a close-up view of the optical coupling depicted in FIG. 2.

FIGS. 2 and 3A show an optical coupling 152 of electronics device 150 and FIG. 3B shows a connector assembly 101 of an optical cable assembly 100 according to one embodiment. Specifically, FIG. 2 illustrates an electronics device 150, and FIG. 3A illustrates a close-up view of the optical coupling 152 of the electronics device 150. FIG. 3B illustrates an optical coupling 152' of the connector assembly 101. It is noted that the optical coupling 152' of the connector assembly 101 shares similar components as the optical coupling 152 of the electronics device 150, and that the optical coupling 152 of the device 150 will be described in detail; however, the description of the optical coupling 152 of the electronics device illustrated in FIG. 3A also applies to the optical coupling 152' and the other likewise components labeled with prime numbering in the connector assembly 101 illustrated in FIG. 3B, except as generally noted herein. The connector assembly 101 of FIG. 3B is reconfigured as an off-axis connector meaning optical cable 102 does not enter connector housing 105 in the same direction as the optical transmission axis of the connector assembly 101 as shown. More specifically, connector assembly 101 is a right-angle connector, but other angled or offset connector configurations such as 30 or 45 degree connectors are possible according to the concepts disclosed herein.

The optical cable assembly 100 may be mated with the electronics device 150 via their respective optical couplings (i.e., one optical coupling on each device). The optical coupling 152 is located on the coupling face 151 (i.e., side or portion) of the electronics device 150. Likewise, a corresponding optical coupling may be located on the coupling face (not numbered) of the optical cable assembly 100 such as illustrated in FIGS. 1 and 3B. Regardless whether the optical coupling 152 is located on a cable assembly or electronics device it generally comprises an optical interface 156, an optical component positioned behind or within the optical interface 156 (see FIGS. 4A and 4B), and at least one coded magnetic array 153a and 153b. As illustrated, the optical interface 156 is a planar optical interface 156; however, it should be understood that the optical interface that is planar may comprise features that make portions non-planar or offset with respect to the coupling face, but still are in-scope of the planar definition used herein and allow access for cleaning. In one embodiment, several optical components may be arranged as an array of individual optical components.

FIG. 3A is a close-up view of the optical coupling 152 depicted in FIG. 2, the optical interface 156 is planar and generally flush with the coupling face 151 such that the planar optical interface 156 may be easily wiped off to remove or displace liquid and other substances that may inhibit or interfere with optical transmission between the electronics device 150 and the optical cable assembly 100 of the optical connection. However, some embodiments of the optical coupling may have features that are not flush with the coupling face 151, or are raised above and/or recessed from the coupling face 151 such as for scratch protection and the like.

The planar optical interface 156 illustrated in FIG. 3A comprises a optically transmissive front face 159 and one or more lens components 157, which may be configured as an array of lens components. Any suitable number of lens components 157 may be provided depending on the number of optical channels utilized by the electronics device 150 and/or optical cable assembly 100. Various embodiments of lens components 157 are described in detail herein and may provide signal beam expansion or focusing to aid with signal transmission efficiency. The optically transmissive front face 159 should be optically transmissive to the optical signals transmitted therethrough such that the optical signals may be passed through the optically transmissive front face 159 and received by the coupled devices. In one embodiment, the optically transmissive front face 159 comprises a strengthened glass sheet, such as Corning® Gorilla® glass, but other suitable materials are possible for the optically transmissive front face. Generally, the planar optical interface 156 should be configured such that it displaces (i.e. inhibit droplets) liquids when mated and is planar to allow cleaning of accumulated liquids, grime, dust and other contaminates.

Stated another way, the optical interfaces described herein may be liquid displacing when coupled to a complementary planar optical interface, such that fluids present on either optically transmissive front face 159 are displaced (i.e., spread-out) upon coupling and do not unduly interfere with the transmission of optical signals. In some embodiments, the optically transmissive front face 159 may be coated with a coating or otherwise treated such that it is hydrophobic, and any liquid present on the optically transmissive front face 159 is easily displaced, thereby reducing the lens affect for any liquid present. Other coatings or treatments may be applied to the transparent front face 159, such as chemical strengthening, anti-reflection, lamination, diffractive, and hydrophilic coatings as desired. In one embodiment, the optical interface comprises diffractive components instead of lenses for providing enhanced optical coupling between mated optical couplings. The diffractive components may, for example, be structures positioned on or within the optically transmissive front face 159 (e.g., structures etched onto the transmissive front face 159).

The optical interfaces of the embodiments described herein may be planar and configured to be coupled to a corresponding (i.e., complementary) optical interface for making a mated optical coupling. In one embodiment, the planar optical interface of a first optical coupling is configured to physically contact the planar optical interface of a second, mated optical coupling such that liquid present on the first planar optical interface and/or the second planar optical interface is displaced about the optical couplings. In another embodiment, the planar optical interface is configured to be in close proximity to a mated optical interface, but not intended to contact optical interfaces when in a coupled relationship. As an example and not a limitation, the planar optical interface of a first optical coupling may be configured to be within 100 microns (μm) of the planar optical interface of a second, mated optical coupling. Other distances between the planar optical interfaces may be utilized depending on the application.

Figure 4A:
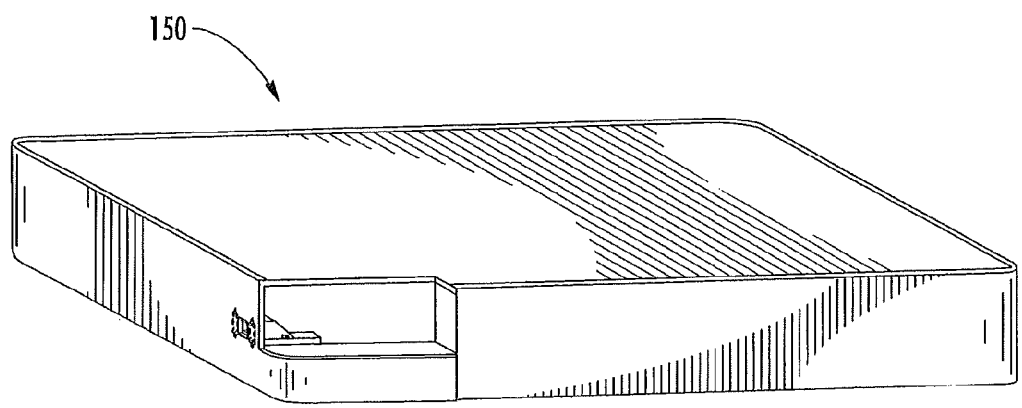
FIG. 4A schematically depicts a top, side perspective view of the electronics device depicted in FIG. 1 having a portion of a device housing removed according to one or more embodiments shown and described herein.
Figure 4B:
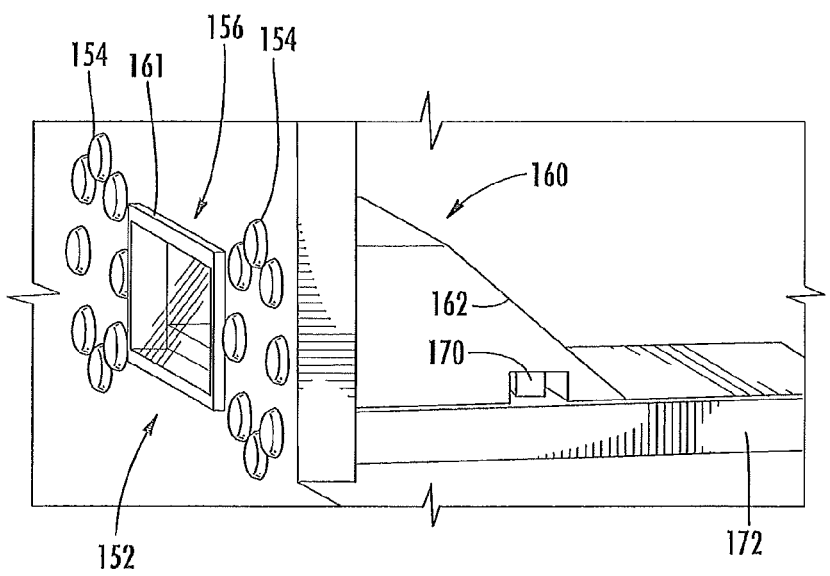
FIG. 4B schematically depicts internal components of the optical coupling depicted in FIG. 2 according to one or more embodiments shown and described herein.

Referring to FIGS. 4A and 4B, internal components of the optical coupling 152 of the illustrated electronics device 150 are illustrated schematically in a cut-away view. Specifically, FIG. 4B is a close-up view of the optical coupling depicted in FIG. 4A and a portion of the external housing of the electronics device 150 is shown as removed for illustration purposes. Generally, the optical coupling of the electronics device may include one or more active optical components, such as a laser diode (e.g., VCSEL, distributed Bragg reflector laser, Fabry-Perot laser, etc.) or a photodiode, while the optical coupling of the optical cable assembly may include a lens component and an optical fiber for optical signal transmission, for example.

Figure 4C:
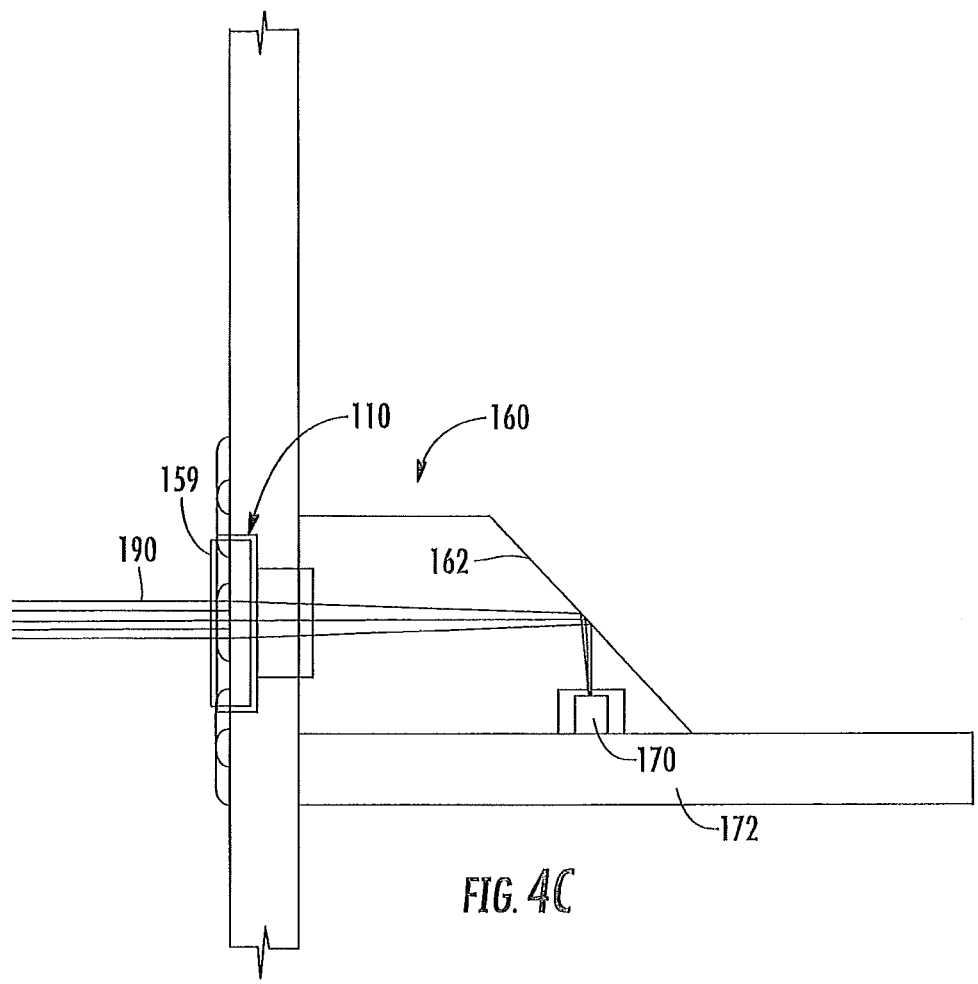
FIG. 4C schematically depicts a side view of an optical signal within an optical coupling according to one or more embodiments shown and described herein.

In one embodiment, the optical coupling 152 comprises an optical coupling housing 160 in which the optically transmissive front face 159 of the planar optical interface 156 may be mounted via a bezel feature 161 or other mounting arrangement. For the sake of clarity in the illustration, the optically transmissive front face 159, as well as lens components 157 of a lens assembly 110, are removed from FIG. 4B (see FIGS. 5, 6A, and 6B). The optical coupling housing 160 may extend into the electronics device 150 and maintain one or more active optical components 170, such as laser diodes (e.g., VCSEL laser diodes, DBR laser diodes, etc.) and photodiodes such as mounted to a substrate such as a PCB or the like for the transmission and receipt of optical signals. FIG. 4C schematically shows an collimated optical signal 190 as passing through the optically transmissive front face 159, and focused by a lens assembly 110, and making a turn by a reflective rear surface 162 such as by a right-angle turn. Optical signals may be generated or received in this manner by the active optical components maintained within the optical coupling housing. It should be understood that other configurations are also possible besides different angles, including those that do not reflect the optical signal 190; but, instead direct the optical signal to the active optical components without redirecting the optical signal.

The lens assembly 110, as well as the optically transmissive front face 159, may take on a variety of different configurations as desired. FIGS. 5, 6A, and 6B illustrate two of many possible implementations as explanatory embodiments. FIG. 5 illustrates a lens assembly 110 having integral lens components comprising a ferrule body 111 and a lens cap 113. In this embodiment, optical fibers (not shown) are inserted into the ferrule body 111 through a fiber bore 112 up to a ferrule end face 114, such that a fiber end of the optical fiber is positioned at a coupling end defined by the ferrule end face 114 (i.e., a fiber end location). During insertion, the optical fiber may extend beyond the ferrule end face 114 wherein it is then cleaved or finished (e.g., by a laser cleaving process or the like) such that it is substantially flush with the ferrule end face 114. In another embodiment, a mechanical stop may be utilized to ensure that the optical fiber is substantially flush with the ferrule end face 114. The optical fiber may be bonded into the ferrule body 111 using a suitable adhesive. Of course, other configurations are possible using other shapes, parts, arrangements, etc for the ferrule body.

The lens cap 113 may comprise an integral lens component 117 that may form the lens components 157 illustrated in FIG. 3A. The integral lens component 117 may focus the optical signal for transmission or reception as illustrated in FIG. 4C, for example. In one embodiment, the lens cap 113 may comprise ribs 116a, 116b that may be positioned into corresponding recesses 115a, 115b of the ferrule body 111 for securing the same. The lens cap 113 may then be secured and/or bonded to the ferrule body 111. In this embodiment, an external surface of the lens cap 113 may form at least a portion of the optically transmissive front face 159. In this manner, the transparent front face 159 and the lens components 157 may be integrated into a single component. Other configurations are also possible for the lens cap.

FIGS. 6A and 6B illustrate another possible configuration for the lens assembly and optically transmissive front face. In this embodiment, external lenses are converted to internal lenses via a lens cover that may act as the optically transmissive front face 159. The lens assembly 210 generally comprises a lens assembly body 211 and an optically transmissive cover 259. The lens assembly 210 may comprise a lens array 220 of several lens components 217 (e.g., similar to the lens components 157 illustrated in FIG. 3A), optical fiber recesses 219, and optical fiber bores 212 opening to optical signal apertures. An optical fiber or an optical fiber stub may be provided within the lens assembly body 211 within the optical fiber recesses and optical fiber bores 212. In one embodiment, the optical fibers may be maintained within the optical fiber recesses 219 by fiber securing structures 218 and/or an adhesive. Optical signals propagating within the optical fibers may pass into and out of the lens assembly body 211 at a rear surface 223 via the optical signal apertures defined by the optical fiber bores 212. When the lens assembly body 211 is provided within an optical coupling of an electronics device (e.g., the electronics device 150 illustrated in FIGS. 4A-4C), the optical signals propagating into and out of the lens assembly body 211 at the rear surface 223 may be passed to and from active optical components, such as laser diodes and photodiodes (e.g., active optical component). When the lens assembly body 211 is provided within an optical coupling of an optical cable assembly (e.g., the optical cable assembly illustrated in FIG. 1), the optical signals propagating into and out of the lens assembly body 211 at the rear surface 223 may be passed to and from optical fibers of the optical cable assembly.

The optically transmissive cover 259 converts the external lens components 217 into internal lens components such that that the lens components 217 are positioned behind the optically transmissive cover 259. The optically transmissive cover 259 may be attached or coupled to the lens array 220 by a variety of mechanical coupling methods. In the illustrated embodiment, a centrally-located coupling rod 221 protrudes from a face of the lens array 220 and is configured for aligning and receiving the optically transmissive cover 259 via a centrally-located hole 222. Moreover, the skilled artisan understands that other structures may be provided on either component for securing/attaching the cover such as with a snap-fit. For instance, corner castellations may also be provided on a front face of the lens array 220 that are configured to be coupled to grooves or other features of the optically transmissive cover 259 to aid in coupling. Many other various coupling arrangements are possible and may be utilized with the concepts disclose herein. Additionally, various lens component configurations may be utilized. In one embodiment, the lens components are configured as gradient-index (GRIN) lenses, but other suitable lenses are possible for manipulating the optical signal.

For optimal optical coupling, the optical component(s) of a first optical coupling should be properly aligned with the optical component(s) of a second optical coupling. For example, the optical components of an electronics device may be laser and photodiodes, while the optical components of an optical cable assembly may be the ends of optical fibers within an optical cable assembly. When the optical cable assembly is coupled to the electronics device, the ends of the optical fibers should be aligned with the laser and photodiodes for proper optical signal transmission. In embodiments that utilize lenses, such lenses of each coupled device should be properly aligned. The tolerance on alignment for optical couplings should be less than 80 µm; and, more preferably the tolerance on alignment for optical coupling is less than 40 µm between the respective optical transmission centerlines of the respective channels for efficient optical coupling. In one embodiment, the tolerance on alignment between the corresponding optical couplings may be on the order of 30-40 µm, and more preferably, 10-20 µm.

Conventional optical connections use mechanical features for providing these precise alignment requirements. However, such mechanical features may not be necessary on planar interfaces such as those described herein, although some mechanical features may be provided as desired or required. Embodiments described herein utilize coded magnetic arrays to provide alignment between the optical components of two mated optical couplings. Coded magnetic arrays are advantageous since the use of many individual magnetic regions may allow for random alignment errors of a single magnet-to-magnet coupling relationship to cancel out. The coded magnetic arrays described herein may allow for optical couplings to self-align with respect to one another. Uses of such coded magnetic arrays are also useful for a liquid displacing optical interface. Consequently, conventional magnetics should not be confused with coded magnetics; moreover, the coded magnets may allow for smaller tolerance on alignment compared with conventional magnetics.

Figure 10A:
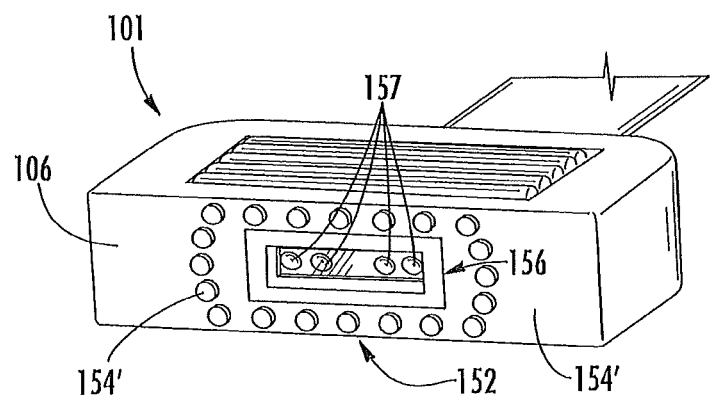
FIGS. 10A and 10B schematically depict exemplary coded magnetic arrays of an optical assembly provided in a connector assembly according to one or more embodiments shown and described herein.
Figure 10B:
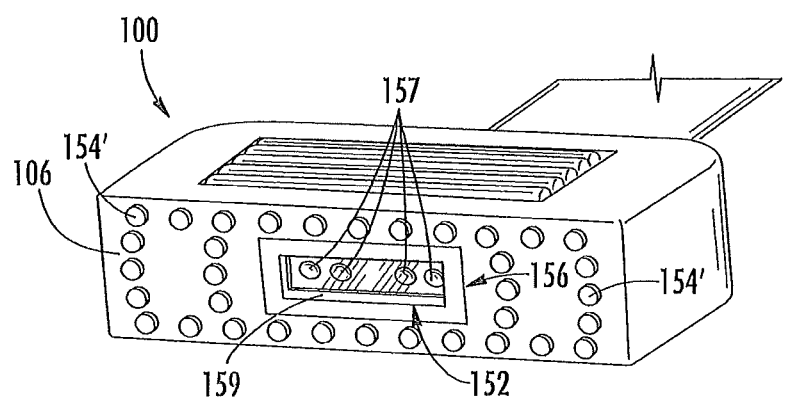

Referring once again to FIG. 3A, two coded magnetic arrays 153a and 153b comprising individual magnetic regions 154 may be positioned next to a first edge 158a and second edge 158b of planar optical interface 156, respectively. Although FIG. 3A illustrates two coded magnetic arrays 153a, 153b, more or fewer coded magnetic arrays may be provided (e.g., as illustrated in FIGS. 10A and 10B, a single coded magnetic array of various configurations may be used). The individual magnetic regions 154 may be embedded into the coupling face 151 or located at a surface. For example, the magnetic regions may be configured as individual magnets that are maintained within magnet recesses of the coupling face 151. In another embodiment, the magnetic regions may be configured as individual magnets that are provided in a molded magnet holder that is then inserted into an opening of the coupling face. In yet another embodiment, the magnetic regions may be configured as a bulk magnetic material that is magnetized to form the desired magnetic regions such as magnetizing in situ so that the coded magnetics are referenced to the optical coupling in situ. In other words, the bulk magnetic material may be coded using a station to apply a specified magnetic field to "magnetically write" to the bulk material at a predetermined location.

An in situ magnetizing process is one in which bulk magnetic material is magnetized in precise zones (i.e., desired magnetic regions) in place within the device. The in situ process may advantageously eliminate the need for the assembly of small magnets difficult and time-consuming manufacturing techniques. In one embodiment, the lens assembly may contain recesses into which suitable magnetic material could be deposited or attached. The lens assembly having the magnetic material may then be optically aligned to a device that imparts the coded magnetic properties to the bulk magnetic material in a predetermined polarity array. In another embodiment, the bulk magnetic material may be provided within the coupling face rather than the lens assembly or other suitable location.

Figure 7:
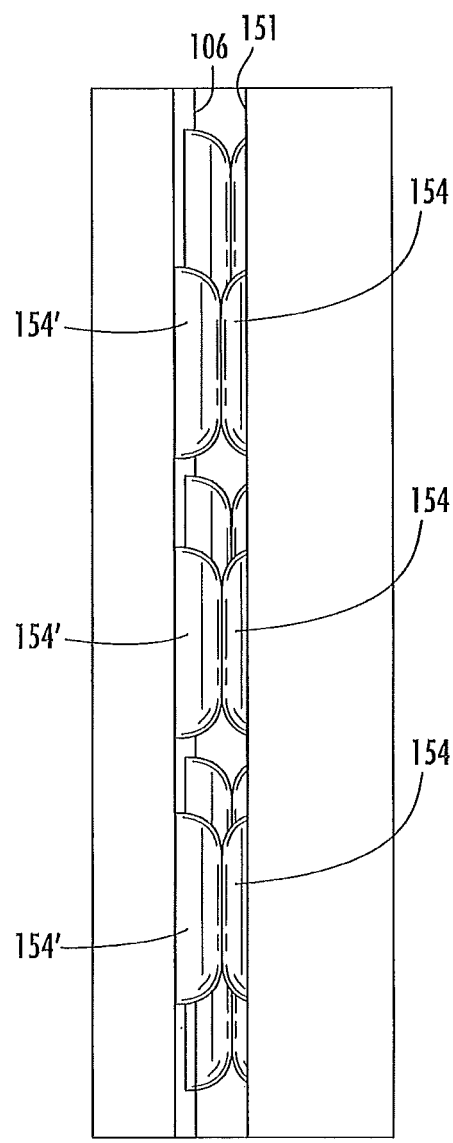
FIG. 7 schematically depicts a partial side view of an optical cable assembly coupled to an electronics device via optical couplings according to one or more embodiments shown and described herein.

The coded magnetic arrays 153a and 153b are coded in the sense that the polarity of each magnetic region is in accordance with a magnetic coding pattern such that a first coded magnetic array may only mate with a corresponding coded magnetic array having a magnetic coding pattern that is opposite from the magnetic coding pattern of the first coded magnetic array. FIG. 7 depicts a close-up view of the optical cable assembly 100 coupled to the electronics device 150 illustrated in FIG. 1. The polarization of the individual magnetic regions 154 of the coupling face 151 of the electronic device optical coupling 150 are magnetically attracted to the polarization of the individual magnetic regions 154' of the coupling face 106 of the optical cable assembly 100 since respective regions 154 and 154' have opposite polarities. Moreover, it is the plurality of individual magnetic regions that allow the precise alignment (e.g., tighter alignment tolerance) since they reduce the variance in offset when mating.

By way of explanation, FIGS. 8A-8F illustrate exemplary magnetic coding patterns for rectangular-shaped pattern coded magnetic arrays 153, while FIGS. 9A-9D illustrate exemplary magnetic coding patterns for circular-shaped pattern coded magnetic arrays 153. As a reference for the figures, the cross-hatching on individual magnetic regions represent a first polarity and the non-hatched individual magnetic regions represent a second polarity. Embodiments disclosed herein are not limited to the magnetic coding patterns illustrated in FIGS. 8A-9D, but are shown to illustrate the concepts of magnetic coding patterns and the numerous possibilities. Many other magnetic coding patterns and geometric coded magnetic arrays are possible and can include different numbers and arrangements of individual magnetic regions. For instance, the magnetic coding pattern may depend on the magnetic region size, strength, and desired attraction and polarity forces. The magnetic coding pattern that is chosen should be such that the two optical couplings only mate in one way (i.e., magnetic keying of the optical couplings). In one embodiment, the magnetic regions may be configured as a pin-in-hole magnetic profile so that the different polarities create a virtual alignment pin and hole with the magnetic regions.

FIGS. 10A and 10B show a coupling face 106 of a connector assembly 101 of an optical cable assembly 100 having two different examples of coded magnetic array configurations, and that many other configurations are possible. The individual magnetic regions 154' form a single coded magnetic region disposed about a perimeter the planar optical interface 156 instead of on each side. It should be understood that a corresponding electronics device optical coupling may have the same coded magnetic array configuration (i.e., location and spacing) as those illustrated in FIGS. 10A and 10B, but that the polarity of some of the individual magnetic regions are different for creating a magnetically attractive force. The arrangements of the individual magnetic regions 154'illustrated in FIGS. 10A and 10B may provide torque isolation such that the optical cable assembly 100 is not easily disconnected from the device inadvertently.

Accordingly, use of such a coded magnetic array or arrays may provide for fully planar optical interfaces for both optical couplings of an optical cable assembly and electronics device, respectively. The elimination of mechanical structures for alignment may allow for simple cleaning and reducing the places that dirt and other substances may get trapped. In other words, the end user can quickly, simply and easily wipe off the optical interface for cleaning. The embodiments described herein may also comprise electrically conductive features to provide power between coupled devices. Exemplary embodiments of such electrically conductive features are described below.

By way of explanation, FIGS. 11-13C illustrate optical coupling embodiments wherein the coded magnetic array(s) are located within, rather than adjacent to, the planar optical interface. Embodiments providing electrical connections are also depicted.

Figure 11:
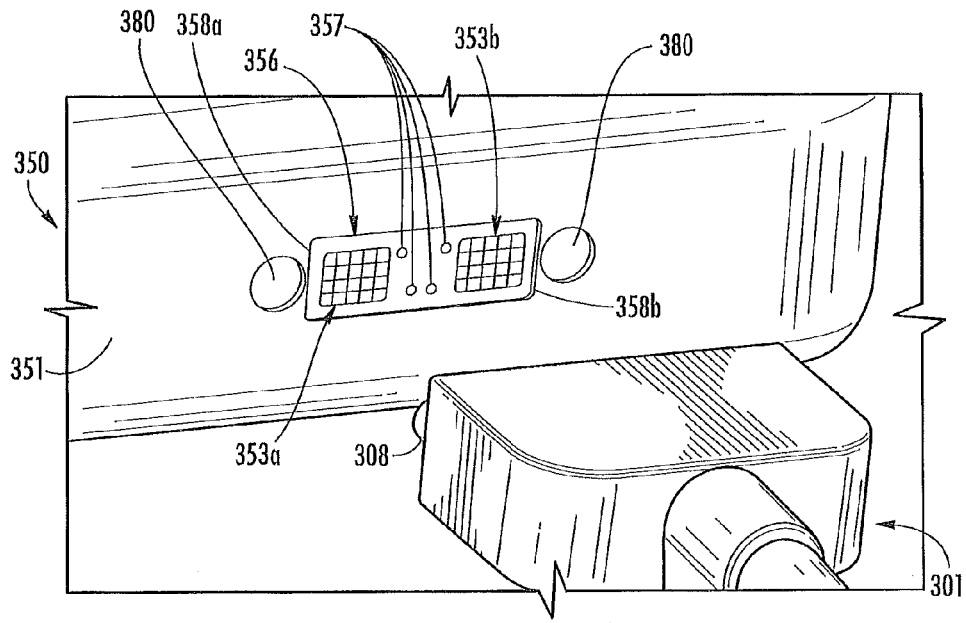
FIG. 11 schematically depicts an optical coupling of an electronics device having a coded magnetic array within an optical interface and a connector assembly of an optical cable assembly according to one or more embodiments shown and described herein.

Referring first to FIG. 11, an electronics device 350 and a connector 301 of an optical cable assembly are illustrated. An optical coupling 352 of the electronics device 350 is shown in detail and connector 301 comprises a corresponding optical coupling, although it is not visible in the view shown in FIG. 11. Connector 301 also includes two male electrically conductive features in the form of spring-loaded, electrically conductive pins 308 that are configured to contact electrically conductive regions 380 (e.g., electrically conductive recesses) located on the coupling face 351 of the electronics device 350 and adjacent a first edge 358a and a second edge 358b of the planar optical interface 356. The electrically conductive pins 308 and electrically conductive regions 380 may enable a host device to provide a client device with electrical power in one embodiment. For example, the optical cable assembly may comprise two electrical conductors (not shown) that span the length of the optical cable assembly and are electrically coupled to the electrically conductive pins. As an example and not a limitation, the optical cable assembly may be connected to a personal computer (i.e., a host device) at one end and a portable electronics device (i.e., a client device) at a second end. The host device may provide electrical power via the electrical conductors, the electrically conductive pins 308, and the electrically conductive regions 380.

The embodiment illustrated in FIG. 11 has an optical coupling 352 that comprises two coded magnetic arrays 353a, 353b and an optical interface 356 having four lens components 357 in an array that are optically coupled to optical components. In an alternative embodiment, such as a connector assembly, the lens components are eliminated and the ends of the optical fibers are positioned at the optical interface 356 such as generally flush. The optical interface 356 of the illustrated embodiment is slightly recessed, but still is substantially planar. The optical components of the optical coupling for the electronics device may be laser and/or photodiodes, while the optical components of the optical coupling for the connector 301 may be optical fiber ends, as described above. Of course, more or fewer lens components may be provided, depending on the particular application and protocol. In the illustrated embodiment, the two coded magnetic arrays 353a, 353b comprise magnetic regions that are arranged in a grid pattern for providing more individual magnetic regions in a relatively small footprint. As an example and not a limitation, the magnetic coding pattern may be configured as a checkerboard pattern of alternating magnetic polarities. Other magnetic coding patterns may also be provided as desired.

The size, density, arrangement and/or polarity of the individual magnetic regions can be tailored for the desired performance. For instance, the size of the individual magnetic regions of a grid may be tailored for improving alignment characteristics. By way of example, the polygonal shape of the individual magnetic regions may have any suitable size such as 1 millimeter square or less, 0.5 millimeter square or less, or 0.1 millimeter square or less. Of course, other shapes, sizes and/or arrangements are possible for the individual magnetic regions using the concepts disclosed.

In one embodiment, the coded magnetic arrays are configured as bulk magnetic material maintained within the planar optical interface 356. The magnetic coding pattern of the coded magnetic arrays 353a, 353b may be imparted in situ as described above, or formed prior to being applied to the planar optical interface 356.

The coded magnetic arrays 353a, 353b both precisely self-align the lens components of the optical coupling of the connector with the lens components 357 of the optical coupling 352 of the electronics device, as well as maintain the connection between the connector 301 and the electronics device 350 via magnetic force. For instance, the tolerances of the alignment may be as described herein.

Figure 12:
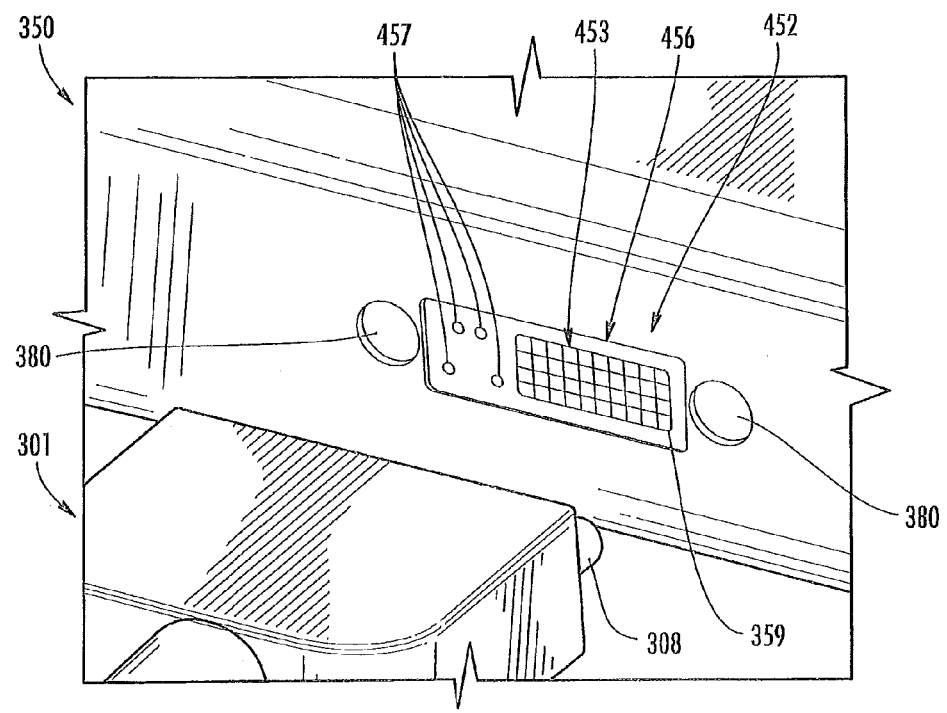
FIG. 12 schematically depicts an optical coupling of another electronics device having a coded magnetic array within an optical interface and a connector assembly of an optical cable assembly according to one or more embodiments shown and described herein.

FIG. 12 illustrates an alternative embodiment similar to FIG. 11 wherein the optical interface 452 is planar and comprises a single coded magnetic array 453 that is positioned off to one side of the lens components 457. Other configurations and/or arrangements are also possible. Further, the optical coupling 352, although depicted as being rectangular in shape, may have other shapes, such as circular or elliptical, for example.

Figure 13C:
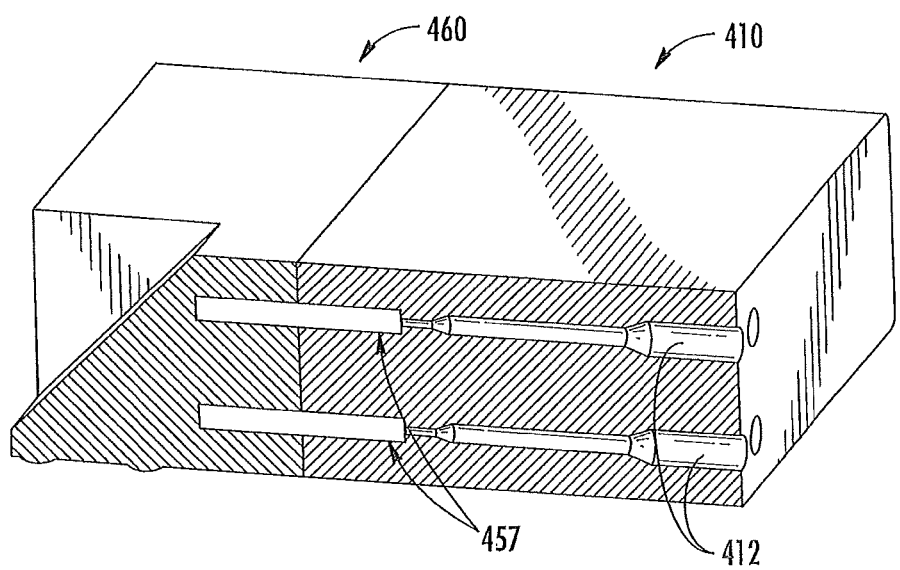
FIG. 13C schematically depicts a cross-sectional, top, side perspective view of a connector optical interface assembly coupled to a device optical interface assembly according to one or more embodiments shown and described herein.

FIGS. 13A-13C illustrate a connector optical interface assembly 410 and a corresponding device optical interface assembly 460 according to one embodiment. FIG. 13A depicts an optical interface 456 that is planar. The planar optical interface 456 of the device optical interface assembly 460 and a rear surface of the connector optical interface assembly 410. FIG. 13B depicts an optical interface 403 of the connector optical interface assembly 410 and a rear surface of the device optical interface assembly 460. FIG. 13C depicts a device optical interface assembly 460 coupled to a connector optical interface assembly 410. The connector optical interface assembly 410 and the device optical interface assembly 460 may be made of a material that is opaque to the optical signals propagating therein.

Referring specifically to FIG. 13A, the device optical interface 456 has a single coded magnetic array 453 that is adjacent to lens components 457. In one embodiment, the lens components 457 are configured as GRIN lenses within the bulk of the device optical interface assembly 460. The device optical interface assembly 460 further comprises an angled rear wall 462 within an optical path of the optical signals so that the optical signal is focused/collimated by the lens components 457 and turns the optical signals in another direction such as a right-turn (e.g., approximately ninety degrees). The device optical interface assembly 460 may be mounted onto a substrate such as a printed circuit board (PCB) 172 within the electronics device via legs 463, such that active optical components may be positioned under the device optical interface assembly 460 and aligned with the lens components 457 by way of the angled rear wall, as described above and depicted in FIGS. 4B and 4C.

The rear surface 413 of the connector optical interface assembly 410 may comprise fiber bores 412 that are configured to receive optical fibers of an optical cable assembly. The optical fibers may be secured within the fiber bores 412 by an adhesive, for example, and may be optically coupled to the lens components 457' like GRIN lenses such as described herein. FIG. 13B illustrates a connector optical interface 403 that corresponds to the device optical interface 456 illustrated in FIG. 13A.

FIG. 13C is a cross-sectional view of the connector optical interface assembly 410 and the device optical interface assembly 460 showing a coupled relationship. As shown in FIG. 13C, the fiber bores 412 of connector optical interface assembly 410 may be configured as illustrated in FIG. 5. In one embodiment, the diameter of the fiber bores 412 may become larger away from the lens components 457' for ease of insertion of the optical fiber. The connector optical interface assembly 410 and the device optical interface assembly 460 are shown coupled together by a completely flat interface without the use of mechanical alignment and engagement structures. The coded magnetic arrays of each interface allow the lens components of the respective optical couplings to be automatically aligned with one another for optimum optical coupling such as using the tolerance for alignment as disclosed herein.

FIGS. 14A-16 depict another embodiment of an optical coupling of an optical cable assembly and an electronics device in which the optical coupling of the optical cable assembly is configured to translate within a connector housing. Referring to FIGS. 14A-14D, one embodiment of an optical cable assembly 500 comprising an optical coupling configured as a retractable ferrule assembly 510 is illustrated. As described in more detail below, the ferrule assembly 510, which includes an optical interface 552, is configured to translate within the connector housing 505 such that it remains protected from contaminants, and is still easily accessible to clean for removing dirt and debris. According to one embodiment, the optical cable assembly 500 comprises a fiber optic cable 502 comprising one or more optical fibers, and a connector assembly 501 comprising a connector housing 505, a plug portion 530 defining a plug enclosure, first and second arms 532a, 532b and a ferrule assembly 510. The ferrule assembly 510 is configured to translate within the connector housing 505 and the plug portion 530 along the y-axis, which may be the optical axis of which the optical signal propagates. Embodiments are not limited to the configuration illustrated in FIGS. 14A-14D, and other variations are possible according to the concepts disclosed herein. For example, some embodiments may not have the plug portion 530 such that the ferrule assembly 510 is fully enclosed by the connector housing 505.

The connector housing 505, which may be made of a dielectric material, such as plastic, defines a connector enclosure and a connector housing opening from which the plug portion 530 extends and the ferrule assembly 510 is disposed. The plug portion 530 may be configured as a sleeve that mates with a corresponding female plug region of an electronics device. In one embodiment, the plug portion 530 is electrically conductive such that it may couple the electronics device to a ground reference potential. In another embodiment, the plug portion 530 is electrically isolative. The plug portion 530 may comprise an access recess 539 configured as a notch therein to provide access to an optical coupling region 556 of the ferrule assembly 510 in the event that the optical coupling region 556 needs to be wiped clean.

This embodiment also includes structure for alignment in addition to a retractable ferrule assembly. The first and second arms 532a, 532b, which may be configured to mate with first and second sockets 586a, 586b of an electronics device (FIG. 15), may provide mechanical coupling of the optical cable assembly 500 to the electronics device such that the connection may be able to withstand greater forces than a magnetic coupling alone. In the illustrated embodiment, the first and second arms 532a, 532b each comprise a dielectric portion 534a, 534b onto which an electrically conductive portion 533a, 533b is located. The electrically conductive portion 533a, 533b may be included to provide electrical power between the coupled electronics devices. Of course, the first and second arms 532a, 532b may be entirely electrically conductive or entirely dielectric depending on the particular application.

Figure 14A:
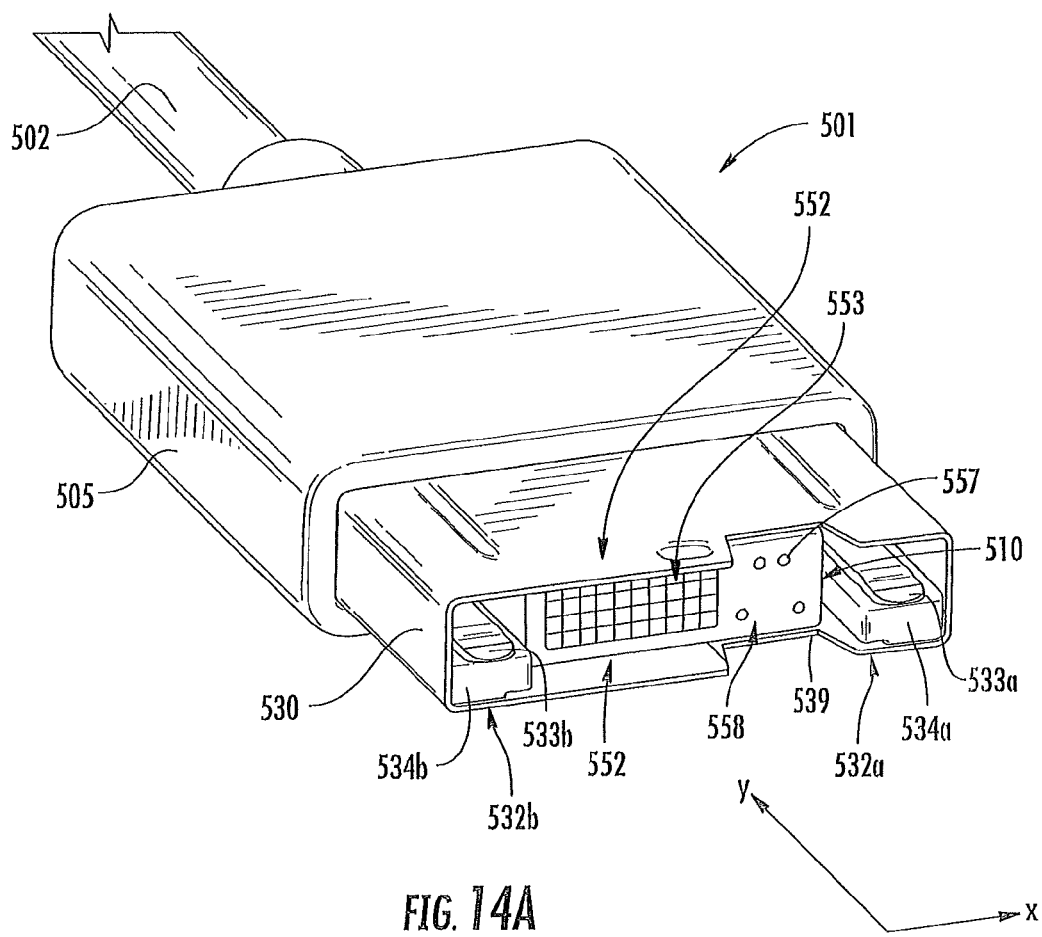
FIG. 14A schematically depicts a top, front-side perspective view of a connector assembly having a translating ferrule assembly according to one or more embodiments shown and described herein.

As shown in the embodiment illustrated in FIG. 14A, the ferrule assembly 510 is similar to the connector optical interface assembly 410 illustrated in FIGS. 13A and 13B. The ferrule assembly 510 provides an optical interface 552 comprising an optical coupling region 558 having one or more lens components 557 for optically coupling (i.e., optical communication) with the optical fibers of the fiber optic cable 502, as described above. The optical interface 552 illustrated in 15A is a planar optical interface. More or fewer lens components may be provided, and the lens components may be arranged in different configurations. A coded magnetic array 553 may be positioned adjacent to the optical coupling region, and may be formed or otherwise configured as described above such that the coded magnetic array 553 comprises a plurality of magnetic regions having a polarity (i.e., a predetermined array of a first magnetic polarity or a second magnetic polarity) in accordance with a magnetic coding pattern. The planar optical interface may take on other configurations, such as the two coded magnetic arrays 353a, 353b illustrated in FIG. 11, as well as many other configurations.

Referring now to FIGS. 14B and 14C, the connector assembly 501 of the optical cable assembly 500 is illustrated with the connector housing and a portion of the plug portion 530 removed to reveal the internal components of the optical cable assembly 500. FIG. 14B illustrates the ferrule assembly 510 in an extended position, while FIG. 14C illustrates the ferrule assembly 510 in a retracted position along the y-axis. In the embodiment illustrated in FIGS. 14B and 14C, the first and second arms 532a, 532b extend from a bias member base portion 535 within the connector enclosure defined by the connector housing 505. The bias member base portion 535 may be secured to a rear portion of the connector housing 505 or have other suitable mounting. The ferrule assembly 510 may be disposed between the first and second arms 532a, 532b such that it does not contact the first and second arms 532a, 532b in an at-rest position, thereby allowing the ferrule assembly 510 to move back and forth slightly along the x-axis.

A rear face of the ferrule assembly 510 may be mechanically coupled to the bias member base portion 535 by a bias member 536. The bias member 536 may take on a variety of forms, and is configured to provide a spring force on the ferrule assembly 510 such that the ferrule assembly 510 may translate along the y-axis and is biased forward. The ferrule assembly 510 may retract into the connector housing 505 when the optical cable assembly 500 is coupled to an electronics device, and then return to an extended position when the optical cable assembly is removed from the electronics device. The bias member 536 may be configured as one or more compression springs as illustrated in FIGS. 14B and 14C, or as springs having other configurations. Because the ferrule assembly 510 is free to move slightly along the x-axis, the ferrule assembly 510 has the freedom to be self-aligned by the coded magnetic array 553.

The bias member base portion 535 may also comprise an optical fiber guide region 537 configured to route the optical fibers 570 of the optical cable to the optical fiber bores and lens elements of the ferrule assembly 510. In an alternative embodiment, the optical cable assembly 500 does not include a bias member base portion 535 such that the bias member is coupled directly to a rear portion of the connector housing 505 within the connector enclosure.

FIG. 14D depicts a side view of the connector assembly depicted in FIGS. 14A-14C with a portion of ferrule assembly 510, the plug portion 530, and the dielectric portion 534a of the electrically conductive portion 533a of the first arm 532 removed for clarity to reveal one of the lens components 557 such as a GRIN lens or the like. Also shown in FIG. 14D is a close-up view of the area labeled A to depict that the GRIN lens component 557 has a facet with an angle α with respect to a front face 511 of the ferrule assembly 510. The lens component 557 may have facet angle α to increase optical coupling. As an example and not a limitation, the angle α may be between about zero degrees to about ten degrees as desired. In another embodiment, the angle α may be less than about 5 degrees. Although the lens components 557 may have a facet angle, the optical interface is still substantially planar because the optical interface may be easily wiped clean. Further, the lens may slightly extend from the front face although it is shown slightly recessed.

Figure 15:
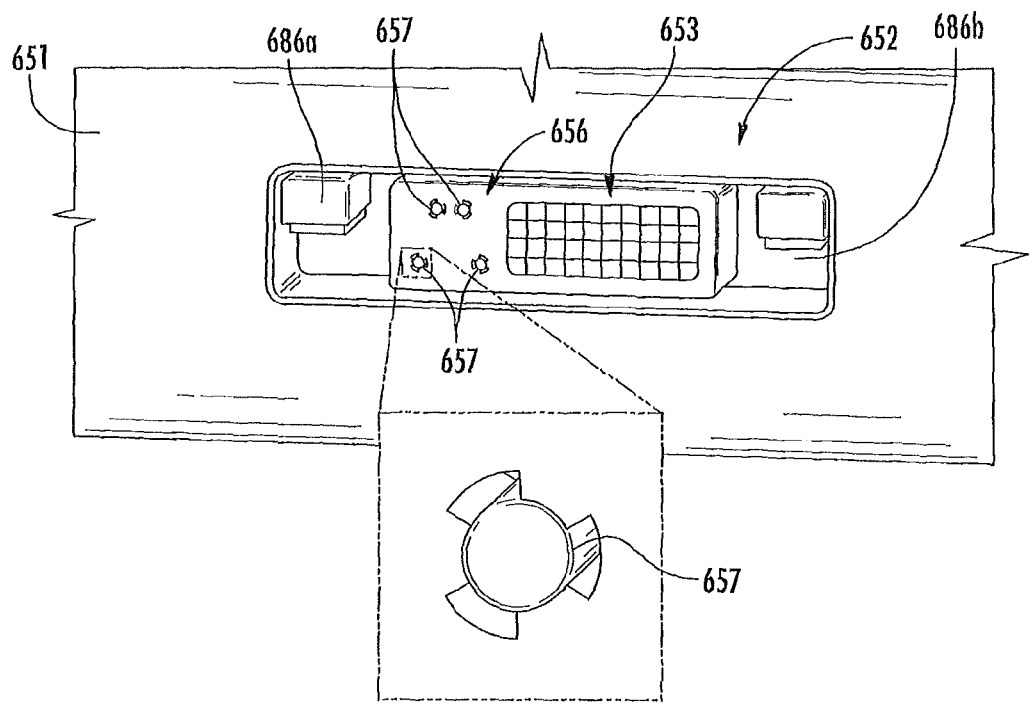
FIG. 15 schematically depicts a perspective view of an optical coupling of an electronics device configured to mate with the connector assembly depicted in FIGS. 14A-14C according to one or more embodiments shown and described herein.

FIG. 15 shows a corresponding optical coupling 652 of an electronics device configured to mate with the optical cable assembly depicted in FIGS. 14A-14C according to one embodiment. The optical coupling 650 is configured as a recessed region (i.e., a coupling recess) within a coupling face 651 of the electronics device. The optical interface 652 may be provided by an optical interface assembly similar to the device optical interface assembly 460 illustrated in FIGS. 13A and 13B. The optical interface 652 and optical interface assembly may have a generally planar surface, as illustrated in FIG. 15. The planar optical interface 652 may generally comprise a coded magnetic array 653 and an optical coupling region (not numbered) comprising one or more lens components 657. In the embodiment of FIG. 15, each lens component (e.g., GRIN lens) comprises a raised rib alignment structure in a drafted bore. The planar optical interface 652 may be maintained within the recessed region such that it is substantially flush with a coupling face 651 of the electronics device so that it may be easily wiped clean. However, the planar optical interface 652 may not be flush with the coupling face 651 in other embodiments. The lens component 657 may extend beyond the plane defined by the planar optical interface 652. In one embodiment, the lens component 657 is configured as a GRIN lens that extends beyond the surface of the planar optical interface and has a facet that is angled to enhance optical coupling. As an example and not a limitation, the facet of the lens components may be between 0 degrees to 10 degrees. Other facet angles may be utilized depending on the particular application.

The optical coupling 652 may further include a first socket 686a and a second socket 686b configured to receive the first arm 532a and the second arm 532b of the optical cable assembly 500, respectively. The first and second sockets 686a, 686b may take on configurations other than a socket depending on the configuration of the first and second arms 532a, 532b. In alternative embodiments, more or fewer arms and sockets may be utilized. The first and second sockets 686a, 686b may have an electrically conductive portion configured to be electrically coupled to the electrically conductive portion 533a, 533b of the first and second arms 532a, 532b. In an alternative embodiment, the optical coupling of the device has the male first and second arms and the optical coupling of the connector has the female first and second sockets.

Figure 16:
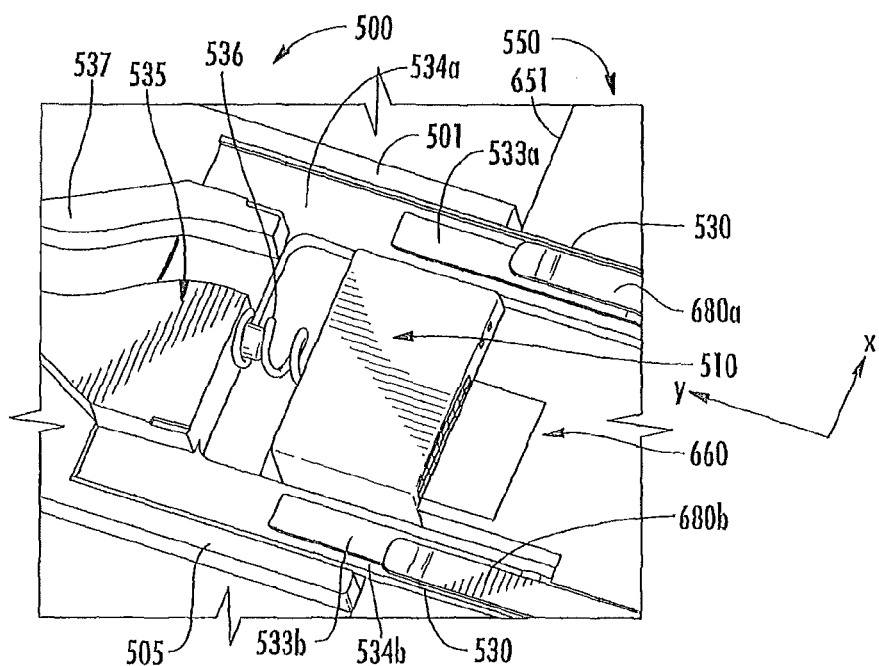
FIG. 16 schematically depicts still another connector assembly of an optical cable assembly coupled to an optical coupling of an electronics device according to one or more embodiments shown and described herein.

FIG. 16 depicts a close-up view of a connector housing 505 of an optical cable assembly 500 coupled to an electronics device 550 according to one embodiment. Portions of the connector and device housings are shown as removed to depict the internal components and coupling relationships. An operator inserts the plug portion 530 of the optical cable assembly 500 into the optical coupling 652 of the electronics device 650 such that the first arm 532a and the second arm 532b of the optical cable assembly 500 contact a first electrically conductive contact 680a and a second electrically conductive contact 680b of the electronics device 650. As the connector assembly 501 is positioned into the optical coupling 652, the ferrule assembly 510 becomes in close proximity to the planar optical interface 652 such that the individual magnetic regions of the coded magnetic array 553 of the ferrule assembly 510 are attracted to the individual magnetic regions of the coded magnetic array 653 of the electronics device 650. Because the ferrule assembly 510 is free to move slightly in the x-axis direction, it has freedom within the connector assembly 501 to move such that it is automatically aligned with the planar optical interface 652. The ferrule assembly 510 is coupled to the planar optical interface 652 by the magnetic force of the coded magnetic arrays 553, 653. Accordingly, the lens components 557 of the ferrule assembly 510 are precisely aligned with the lens components 657 of the planar optical interface 652 of the electronics device 650.

As the plug portion 530 is further inserted into the optical coupling 652 of the electronics device 650, the bias member 536 is compressed, allowing the ferrule assembly 510 to be retracted within the connector housing 505 in the y-axis direction. The overall distance the ferrule assembly 510 is translated may depend on the dimensions of the components of the connector assembly 501. The plug portion 530 and the first and second arms 532a, 532b provide structural support to the connection between the optical cable assembly 500 and the electronics device 650.

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "approximately" and "about" are utilized herein to represent the inherent degree of uncertainty that may be attributed to any quantitative comparison, value, measurement, or other representation.

We claim:

1. An optical cable assembly comprising:
   a connector housing having a coupling face;
   a lens assembly within the connector housing, the lens assembly including an optical interface and a lens component;
   an optical fiber comprising a fiber end that is maintained within the lens assembly at a fiber end location; and
   at least one coded magnetic array within the coupling face, the at least one coded magnetic array including a plurality of magnetic regions configured for aligning the coupling face.

2. The optical cable assembly of claim 1, the at least one coded magnetic array is operable to optically couple the lens component with a complimentary component of a mated optical coupling to within less than 40 microns of the respective centerlines.

3. The optical cable assembly of claim 1, wherein:
   the lens assembly comprises a ferrule body and a lens cap;
   the fiber end location is at a coupling end of the ferrule body;
   the lens cap is attached to the coupling end of the ferrule body; and
   the lens cap defines the optical interface and includes the lens component.

4. The optical cable assembly of claim 1, wherein:
   the at least one coded magnetic array comprises a first coded magnetic array and a second coded magnetic array; and
   the first coded magnetic array and the second coded magnetic array are on opposite sides of the optical interface.

5. The optical cable assembly of claim 1, wherein:
   each individual magnetic region of the plurality of magnetic regions includes a first magnetic polarity or a second magnetic polarity; and
   the at least one coded magnetic array has a magnetic coding pattern defined by the plurality of magnetic regions having the first magnetic polarity or the second magnetic polarity.

6. The optical cable assembly of claim 1, wherein:
   the at least one coded magnetic array comprises a bulk magnetic material attached to the coupling face; and
   the plurality of magnetic regions of the at least one coded magnetic array are magnetized within the bulk magnetic material according to a magnetic coding pattern.

7. An electronics device comprising:
   a device housing comprising a coupling face;
   an optical coupling within the coupling face, the optical coupling comprising:
      an optical interface within the coupling face;
      an active optical component positioned within the device housing and in an optical path of an optical signal transmitted into and/or out of the optical interface; and
      at least one coded magnetic array within the coupling face, the at least one coded magnetic array comprising a plurality of magnetic regions configured for mating the active optical component.

8. The optical cable assembly of claim 7, the at least one coded magnetic array is operable to optically couple the active component with a complimentary component of a mated optical coupling to within less than 40 microns of the respective centerlines.

9. The electronics device of claim 7, further comprising an optical coupling housing within the device housing and coupled to the optical interface, wherein:
   the active optical component is disposed in the optical coupling housing; and
   the optical coupling housing includes a reflective rear surface for reflecting the optical signal toward the active optical component or toward the optical interface.

10. The electronics device of claim 7, wherein the active optical component is in electrical communication with a printed circuit board, and the optical coupling housing is attached to the printed circuit board such that the optical coupling housing encloses the active optical component.

11. The electronics device of claim 7, wherein:
the at least one coded magnetic array comprises a first coded magnetic array and a second coded magnetic array; and
wherein the first coded magnetic array and the second coded magnetic array are on opposite sides of the optical interface.

12. The electronics device of claim 7, wherein:
each individual magnetic region of the plurality of magnetic regions comprises a first magnetic polarity or a second magnetic polarity; and
the at least one coded magnetic array has a magnetic coding pattern defined by the plurality of magnetic regions having the first magnetic polarity or the second magnetic polarity.

13. The electronics device of claim 7, wherein:
each magnetic region comprises an individual magnet;
the housing surface comprises a plurality of magnet recesses; and
individual magnets are maintained within individual ones of the plurality of magnet recesses.

14. The electronics device of claim 7, wherein:
the at least one coded magnetic array comprises a bulk magnetic material coupled to the housing surface; and
the plurality of magnetic regions of the at least one coded magnetic array are magnetized within the bulk magnetic material according to a magnetic coding pattern.

\* \* \* \* \*